(12) United States Patent　　(10) Patent No.: US 7,954,850 B2
Fischer et al.　　(45) Date of Patent: Jun. 7, 2011

(54) AIR BAG WITH ADAPTIVE VENTING

(75) Inventors: Kurt F. Fischer, Leonard, MI (US);
Heather R. Kramer, Macomb, MI (US);
Amit Sharma, Rochester Hills, MI (US); Alberto Rodriguez, Rochester Hills, MI (US); Douglas Gould, Lake Orion, MI (US); Angelo Adler, Washington, MI (US); Eyad Nayef, Sterling Heights, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 647 days.

(21) Appl. No.: 11/881,918

(22) Filed: Jul. 30, 2007

(65) Prior Publication Data

US 2008/0315567 A1　Dec. 25, 2008

Related U.S. Application Data

(60) Provisional application No. 60/936,710, filed on Jun. 21, 2007.

(51) Int. Cl.
*B60R 21/16* (2006.01)

(52) U.S. Cl. .............. 280/743.1; 280/738; 280/739; 280/743.2

(58) Field of Classification Search ............ 280/738, 280/743.1, 743.2, 739
See application file for complete search history.

(56) References Cited

U.S. PATENT DOCUMENTS

| | | | |
|---|---|---|---|
| 3,527,475 A | 9/1970 | Carey et al. |
| 3,573,885 A | 4/1971 | Brawn et al. |
| 3,642,303 A | 2/1972 | Irish et al. |
| 3,879,057 A | 4/1975 | Kawashima et al. |
| 3,944,249 A | 3/1976 | Smith et al. |
| 4,097,065 A | 6/1978 | Okada et al. |
| 4,262,931 A | 4/1981 | Strasser et al. |
| 4,360,223 A | 11/1982 | Kirchoff |
| 4,500,114 A | 2/1985 | Grey, Jr. |
| 4,805,930 A | 2/1989 | Takada |
| 4,907,616 A | 3/1990 | Bergsma |
| 5,007,662 A | 4/1991 | Abramczyk et al. |

(Continued)

FOREIGN PATENT DOCUMENTS

DE　19640322　3/1998

(Continued)

*Primary Examiner* — Toan C To
(74) *Attorney, Agent, or Firm* — Tarolli, Sundheim, Covell & Tummino LLP

(57) ABSTRACT

An apparatus (10) includes an inflatable vehicle occupant protection device (14) that includes a first panel (160) with at least one first vent opening (142). A second panel (144) secured to the first panel (160) includes a base portion (150) and a door portion (156). The base portion (150) includes at least one second vent opening (200) and is folded to position the door portion (156) between the first panel (160) and the base portion (150). The door portion (156) has an open condition positioned away from the vent openings (142, 200) permitting inflation fluid to vent through the vent openings. The door portion (156) has a closed condition positioned between the first and second vent openings (142, 200) blocking inflation fluid from venting through the first and second vent openings. The door portion (156) is movable to the closed condition when the protection device (14) deploys. The door portion (156) has a generally triangular configuration with a base merging with the base portion (150) of the door panel (144) and first and second edge portions (264) that extend away from the base and converge at a terminal end (224) of the door portion.

64 Claims, 16 Drawing Sheets

U.S. PATENT DOCUMENTS

| | | | |
|---|---|---|---|
| 5,016,913 A | 5/1991 | Nakajima et al. | |
| 5,020,567 A | 6/1991 | Proulx | |
| 5,044,663 A | 9/1991 | Seizert | |
| 5,217,249 A | 6/1993 | Kokeguchi | |
| 5,246,250 A | 9/1993 | Wolanin et al. | |
| 5,405,166 A | 4/1995 | Rogerson | |
| 5,560,649 A | 10/1996 | Saderholm et al. | |
| 5,695,214 A | 12/1997 | Faigle et al. | |
| 5,853,191 A | 12/1998 | Lachat | |
| 5,853,192 A | 12/1998 | Sikorski et al. | |
| 5,899,494 A | 5/1999 | Lane, Jr. | |
| 5,918,901 A | 7/1999 | Johnson et al. | |
| 5,931,497 A | 8/1999 | Fischer | |
| 6,123,358 A | 9/2000 | Ryan et al. | |
| 6,290,257 B1 | 9/2001 | Bunce et al. | |
| 6,390,501 B1 | 5/2002 | Greib et al. | |
| 6,592,146 B2 | 7/2003 | Pinsenschaum et al. | |
| 6,773,030 B2 | 8/2004 | Fischer | |
| 6,832,778 B2 | 12/2004 | Pinsenschaum et al. | |
| 6,932,385 B2 | 8/2005 | Hawthorn et al. | |
| 7,475,906 B2 * | 1/2009 | Goto et al. | 280/743.2 |
| 7,543,849 B2 * | 6/2009 | Bradburn | 280/739 |
| 7,568,729 B2 * | 8/2009 | Schnieder et al. | 280/739 |
| 7,597,356 B2 * | 10/2009 | Williams | 280/739 |
| 7,607,689 B2 * | 10/2009 | Kalczynski et al. | 280/739 |
| 7,631,892 B2 * | 12/2009 | Ishikawa et al. | 280/743.1 |
| 7,673,899 B2 * | 3/2010 | Abe | 280/742 |
| 7,722,080 B2 * | 5/2010 | Rose et al. | 280/743.2 |
| 7,726,685 B2 * | 6/2010 | Abe et al. | 280/736 |
| 7,748,738 B2 * | 7/2010 | Schneider | 280/740 |
| 2008/0007038 A1 * | 1/2008 | Fischer et al. | 280/743.2 |
| 2008/0073892 A1 * | 3/2008 | Rose et al. | 280/739 |

FOREIGN PATENT DOCUMENTS

| | | |
|---|---|---|
| DE | 202006002496 | 8/2006 |
| EP | 1790538 | 5/2007 |
| WO | 2006073534 | 7/2006 |

* cited by examiner

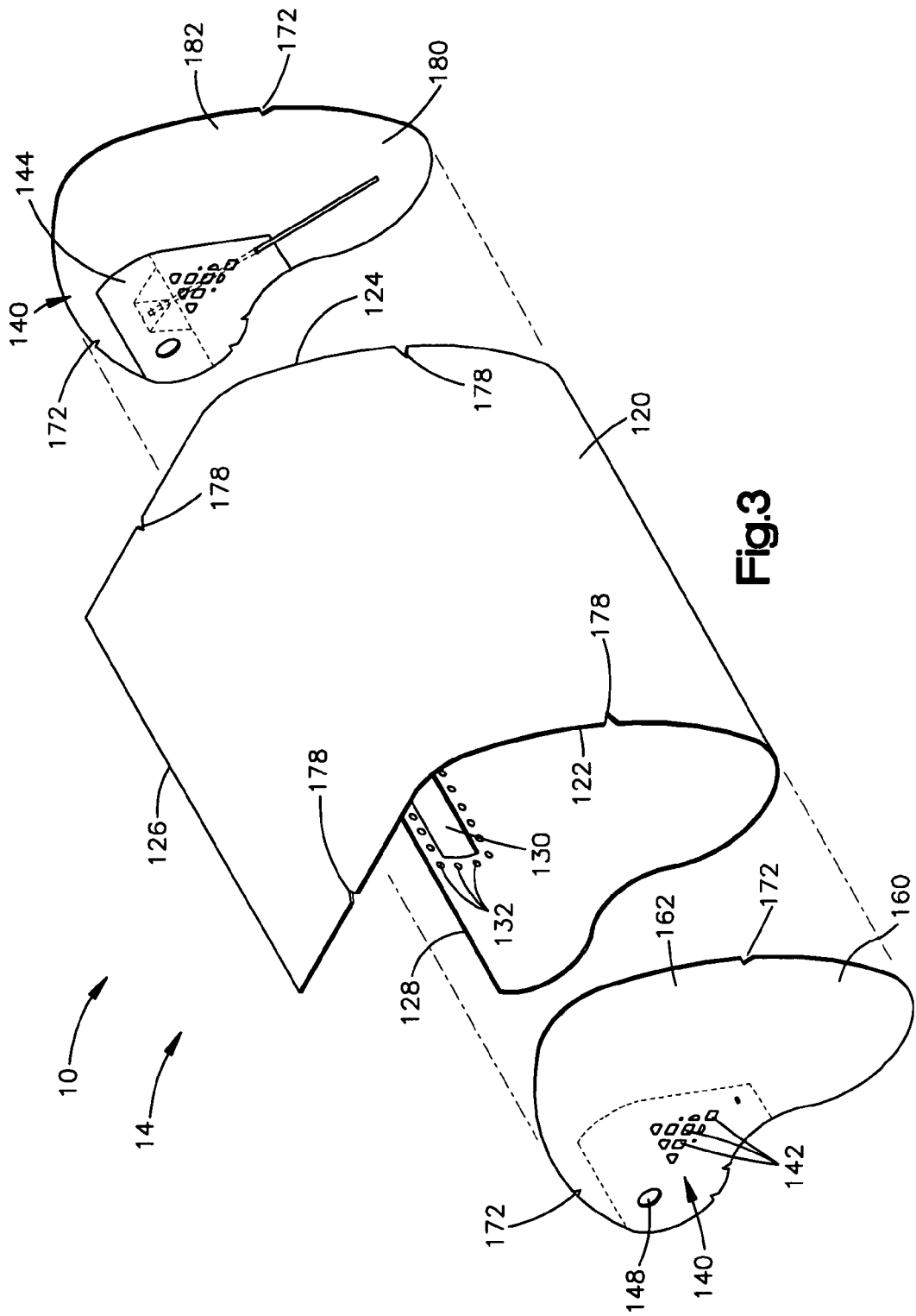

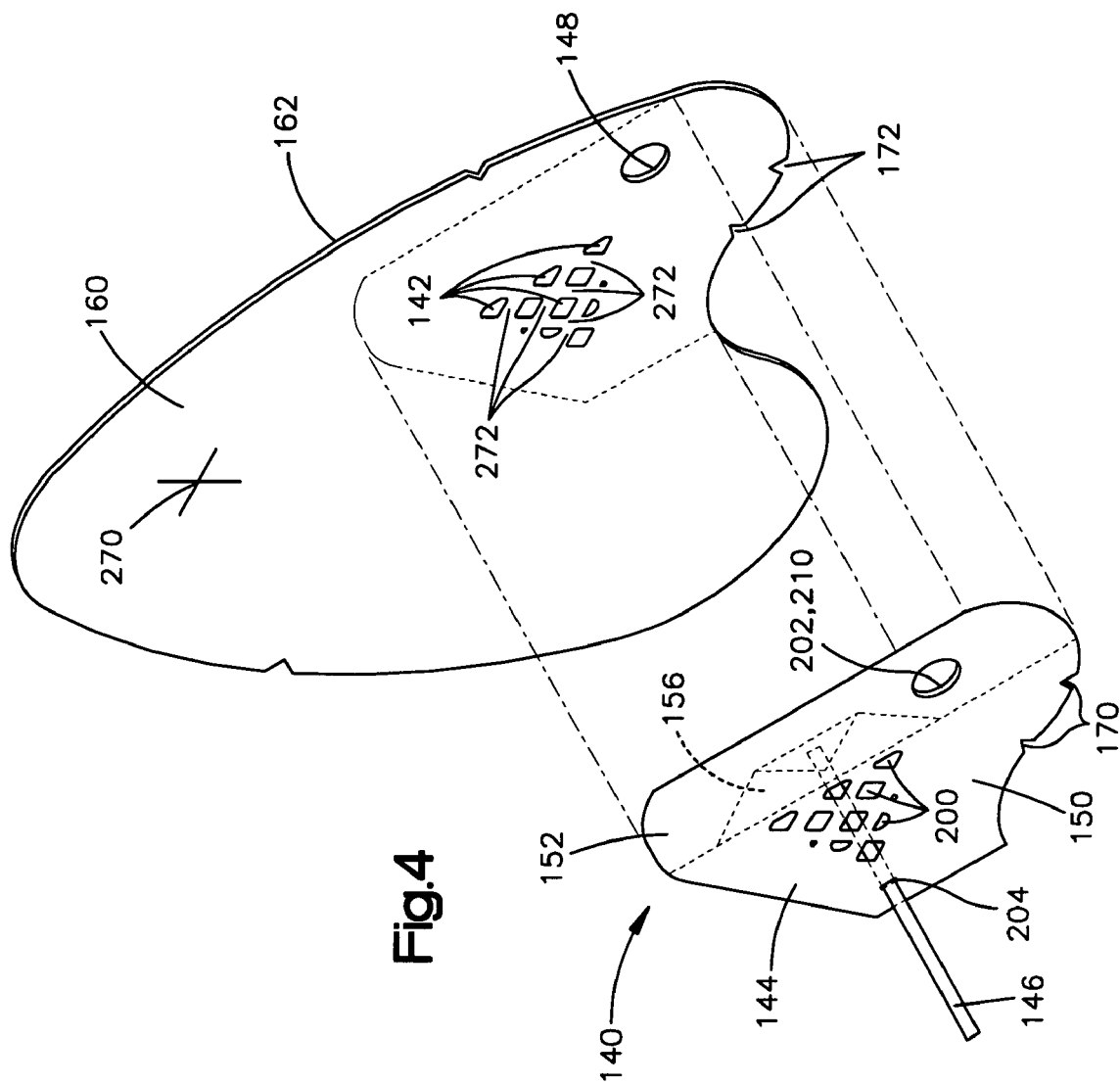

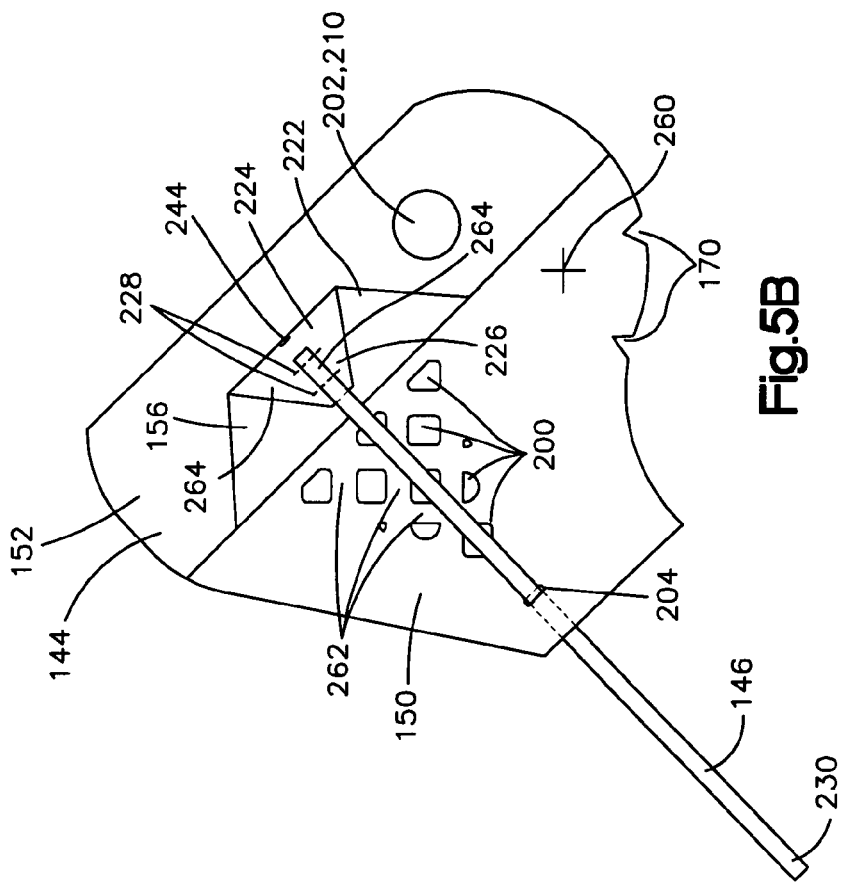

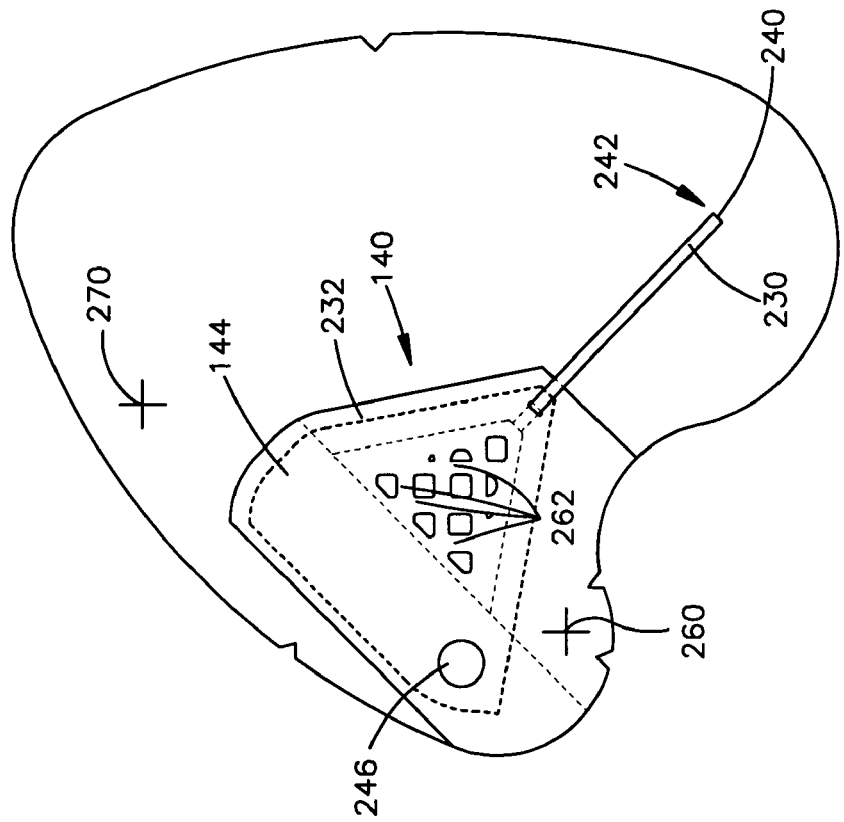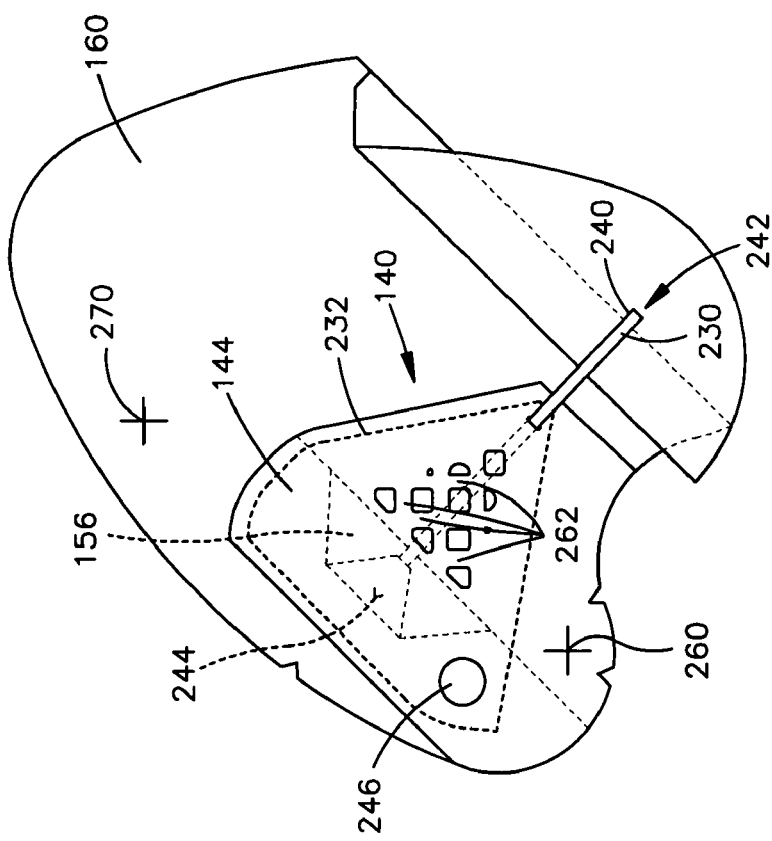

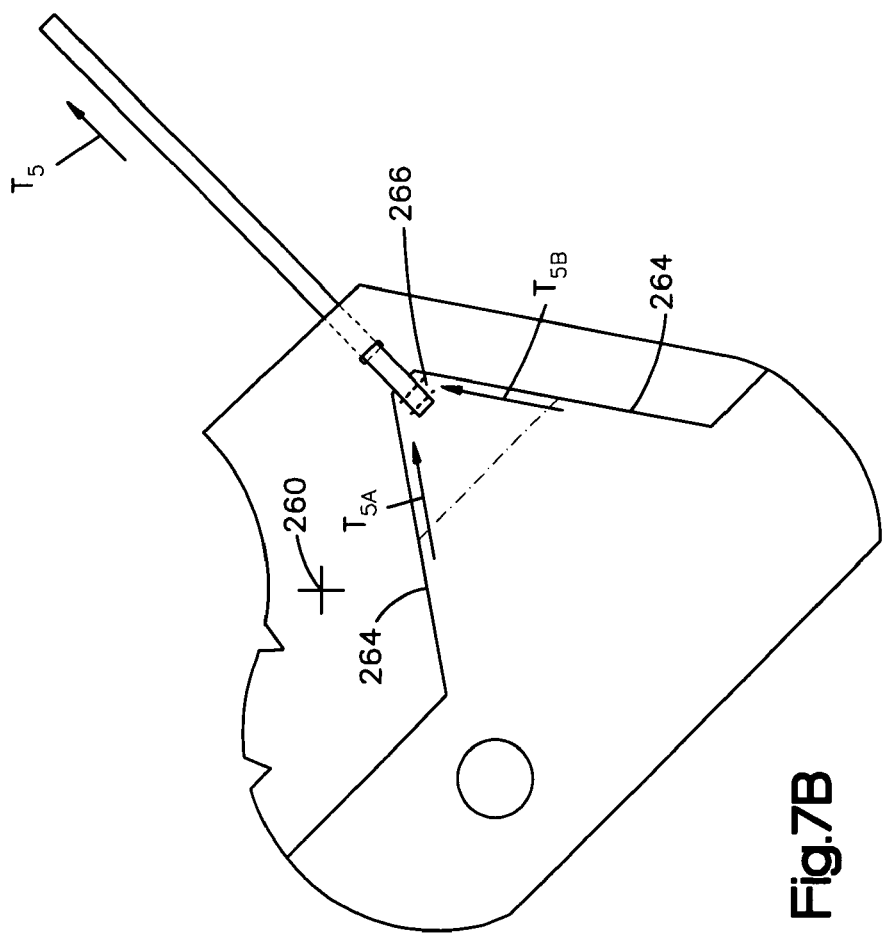
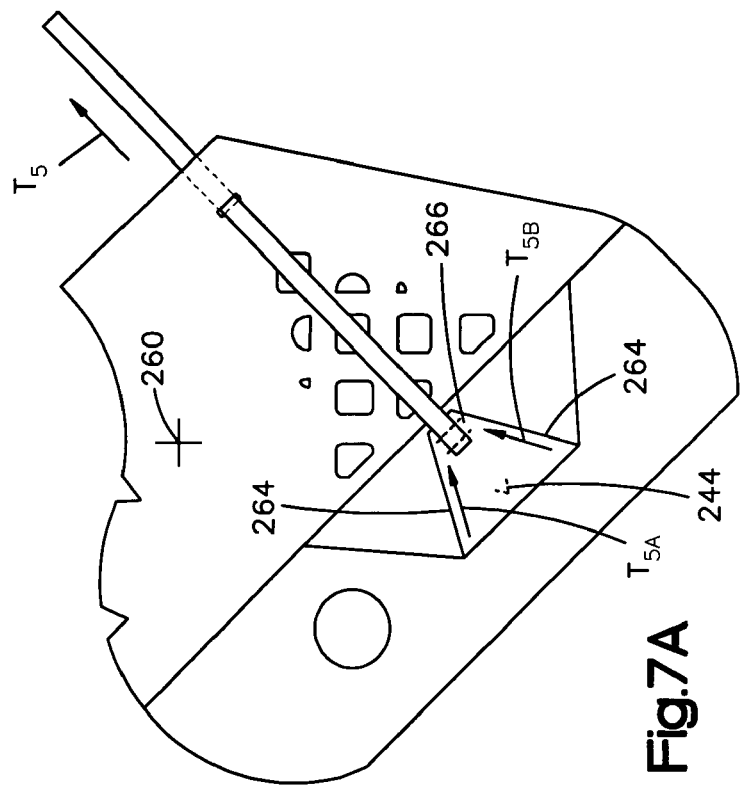

US 7,954,850 B2

AIR BAG WITH ADAPTIVE VENTING

RELATED APPLICATION

This application claims the benefit of U.S. Provisional Application No. 60/936,710, filed Jun. 21, 2007.

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

The present invention also relates to an apparatus for helping to protect an occupant of a vehicle. The apparatus includes an inflatable vehicle occupant protection device. A vent has an open condition releasing inflation fluid from the protection device through the vent. The vent is actuatable to a closed condition blocking the inflation fluid flow through the vent. A releasable connection maintains the protection device in a first condition having a first inflated volume. The releasable connection is releasable to permit the protection device to inflate to a second condition having a second inflated volume greater than the first inflated volume. The releasable connection is releasable when the vent is in the closed condition and being maintained when the vent is in the open condition.

SUMMARY OF THE INVENTION

The present invention relates to an apparatus for helping to protect an occupant of a vehicle. The apparatus includes an inflatable vehicle occupant protection device. The protection device includes a first panel including at least one first vent opening. A second panel secured to the first panel includes a base portion and a door portion. The base portion includes at least one second vent opening and is folded to position the door portion between the first panel and the base portion. The door portion has an open condition positioned away from the first and second openings and thereby permits inflation fluid to vent from the protection device through the first and second vent openings. The door portion has a closed condition positioned between the first and second vent openings and thereby blocks inflation fluid from venting through the first and second vent openings. The door portion is movable from the open condition to the closed condition when the protection device deploys. The door portion has a generally triangular configuration with a base that merges with the base portion of the door panel. The door portion includes first and second edge portions that extend away from the base and converge at a terminal end of the door portion.

The present invention also relates to an apparatus for helping to protect an occupant of a vehicle. The apparatus includes an inflatable vehicle occupant protection device having a deflated condition and an inflated condition. The protection device has a side panel defining first vent openings for enabling flow of inflation fluid out of the protection device. A door panel has a first portion defining second vent openings and a second portion defining a vent door. The second vent openings are aligned with the first vent openings. The vent door has a venting position in which the vent door is positioned away from the aligned first and second vent openings and enables flow of inflation fluid out of the protection device through the aligned first and second vent openings. The vent door is in the venting position prior to inflation of the protection device. The vent door has a blocking position in which the vent door blocks inflation fluid flow out of the protection device through the aligned first and second vent openings. The vent door moves between the venting position and the blocking position when the protection device inflates.

The present invention also relates to an inflatable vehicle occupant protection device. The protection device includes a first panel that helps define an inflatable volume of the protection device. The first panel is constructed from a woven fabric material having a weave orientation. A vent for releasing inflation fluid from the inflatable volume includes one or more vent openings in the first panel. The first panel includes portions configured in a grid-like pattern that at least partially define the vent openings. The grid-like portions extend in directions substantially parallel to the weave orientation of the first panel.

The present invention also relates to an inflatable vehicle occupant protection device. The protection device includes a first panel that helps define an inflatable volume of the protection device. A vent for releasing inflation fluid from the inflatable volume includes one or more vent openings in the first panel and a second panel secured to the first panel. The second panel includes a door portion having an open condition permitting inflation fluid to flow through the vent openings. The door portion moves when a tension force is applied to the second panel to a closed condition at least partially blocking inflation fluid flow through the vent openings. The second panel has a woven construction and is configured and arranged such that the tension force applied to the door portion acts substantially along a weave orientation of the woven second panel.

The present invention also relates to an apparatus for helping to protect an occupant of a vehicle. The apparatus includes an inflatable vehicle occupant protection device having a first inflated condition with a first inflated volume and a second inflated condition with a second inflated volume. The second inflated volume is greater than the first inflated volume. A vent has an open condition releasing inflation fluid from the protection device through the vent and a closed condition blocking inflation fluid flow through the vent. The protection device is maintained in the first inflated condition when the vent is in the open condition. The protection device is released to inflate to the second inflated condition when the vent is in the closed condition.

The present invention also relates to an apparatus for helping to protect an occupant of a vehicle. The apparatus includes an inflatable vehicle occupant protection device. A vent has an open condition and a closed condition. A releasable connection maintains the protection device in a first condition having a first inflated volume when the vent is in the open condition. The releasable connection releases to permit the protection device to inflate to a second condition having a second inflated volume greater than the first inflated volume when the vent is in the closed condition. An actuatable device is actuatable to maintain the vent in the open condition.

The present invention also relates to an apparatus for helping to protect an occupant of a vehicle. The apparatus includes an inflatable vehicle occupant protection device. A vent includes a panel secured to the protection device. The panel has a first portion with vent openings and a second portion including a vent door. The vent has a closed condition in which the vent door blocks the vent openings and an open condition permitting inflation fluid flow through the vent openings. An actuatable device is actuatable to maintain the vent in the open condition.

The present invention further relates to a method for helping to protect an occupant of a vehicle using an inflatable vehicle occupant protection device. The method includes inflating the protection device in response to an event. Inflation fluid is vented from the protection device based on at least one of a sensed vehicle condition and a sensed occupant condition. The vent has an open condition releasing inflation fluid from the protection device through the vent. The vent is actuatable to a closed condition blocking the inflation fluid flow through the vent. A releasable connection is provided, which maintains the protection device in a first condition having a first inflated volume. The releasable connection is releasable to permit the protection device to inflate to a second condition having a second inflated volume greater than the first inflated volume. The releasable connection is adapted to release when the vent is in the closed condition and maintain the releasable connection when the vent is in the open condition.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is an exploded view of a portion of the apparatus of FIG. 1;

FIG. 4 is an exploded view of a portion of the apparatus of FIG. 3;

FIGS. 5A and 5B are plan views illustrating portions of the apparatus of FIG. 4 in different conditions;

FIGS. 6A and 6B are plan views illustrating the apparatus of FIG. 4 assembled and in different conditions;

FIGS. 7A and 7B are plan views illustrating portions of the apparatus of FIGS. 6A and 6B in different conditions;

DETAILED DESCRIPTION OF THE INVENTION

Figure 1:
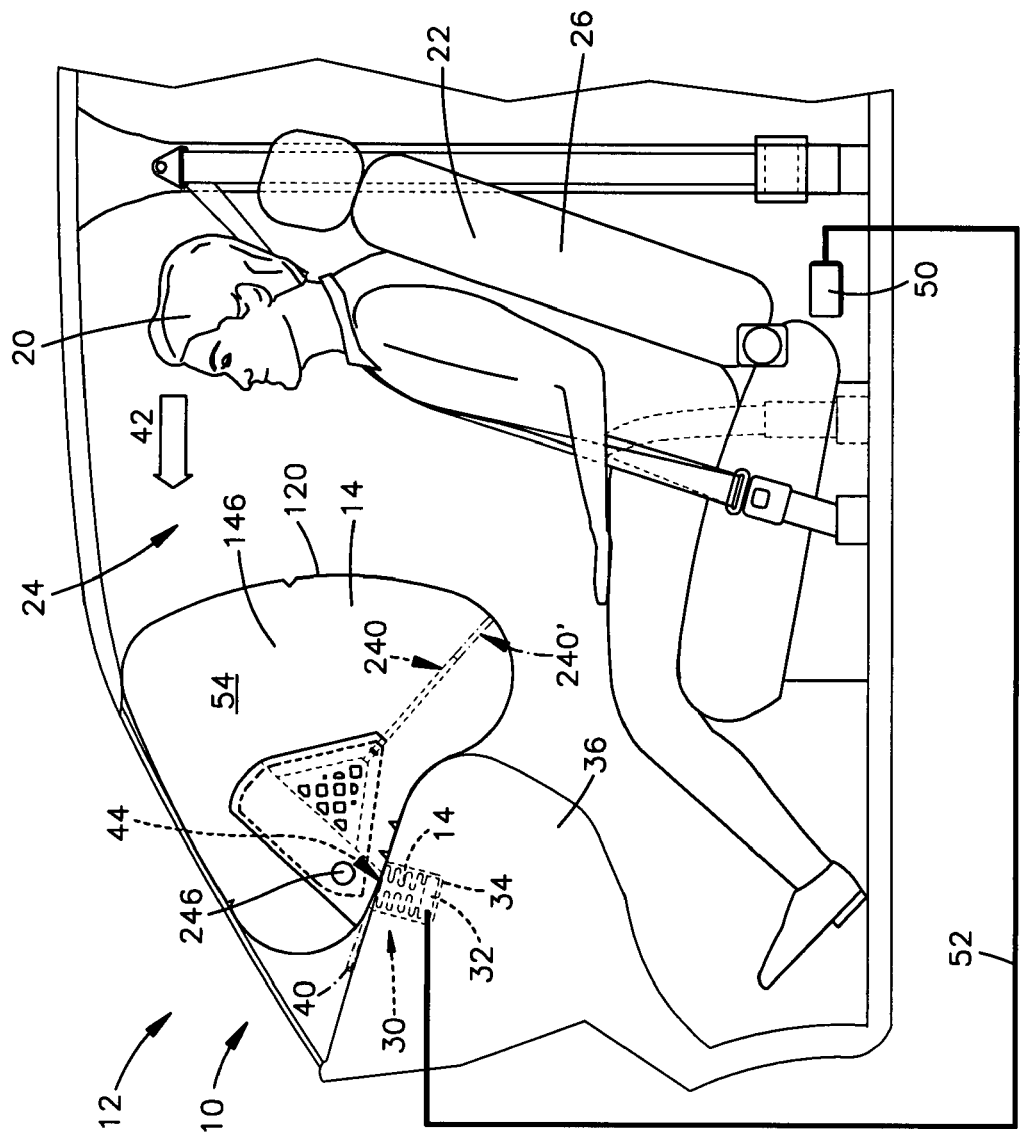
FIG. 1 is a schematic side view illustrating an apparatus for helping to protect an occupant of a vehicle with the occupant being in a first position, according to a first embodiment of the present invention.

An apparatus 10 for helping to protect an occupant 20 of a vehicle 12 includes an inflatable vehicle occupant protection device 14 in the form of an air bag. In the embodiment illustrated in FIGS. 1 and 2, the air bag 14 is a passenger frontal air bag for helping to protect an occupant 20 of a seat 22 on a passenger side 24 of a vehicle 12.

The air bag 14 may be part of an air bag module 30 that includes an inflator 32 and a housing 34. The air bag 14 has a stored condition, indicated by dashed lines in FIGS. 1 and 2, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIGS. 1 and 2 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid for inflating the air bag 14. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material that are interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Figure 2:
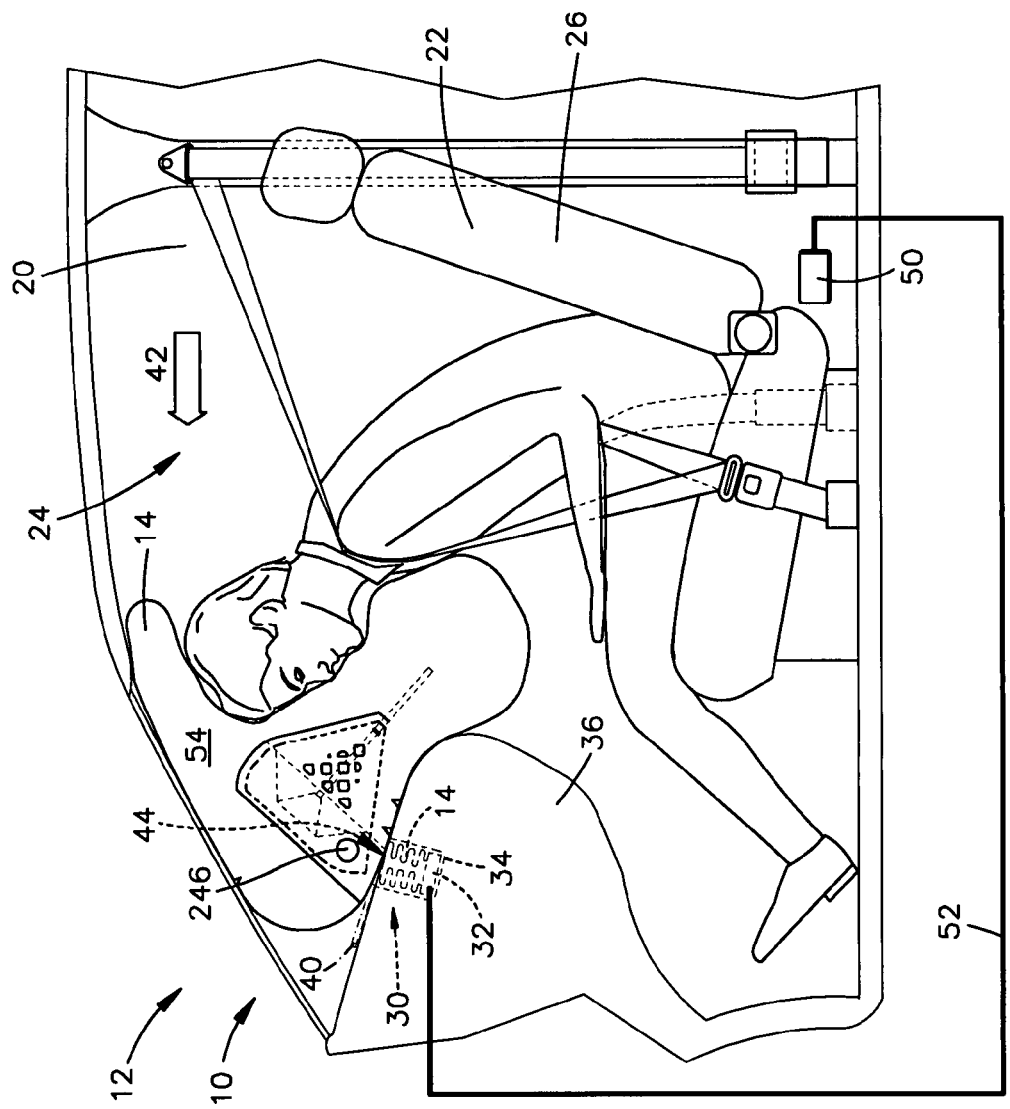
FIG. 2 is a schematic illustration of the apparatus of FIG. 1 with the vehicle occupant in a second position.

FIG. 3 illustrates by way of example one particular construction of the air bag 14 of FIGS. 1 and 2. The air bag 14 includes a center panel 120 and first and second side panels 160 and 180, respectively. The center panel 120 includes first and second longitudinal edge portions 122 and 124, respectively, and opposite end portions 126 and 128, respectively.

The first and second side panels 160 and 180 have curved and contoured configurations that define the profile of the air bag 14, as shown in FIG. 1. The side panels 160 and 180 thus help define the inflated configuration (e.g., shape and depth) of the air bag 14. In the first embodiment, the side panels 160 and 180 are configured such that the inflated configuration of the air bag follows the contour of the instrument panel 36 of the vehicle 12. Those skilled in the art will appreciate that the desired inflated configuration of the air bag 14 may vary among different vehicle models, depending on factors such as available space in the passenger compartment and the architecture of the vehicle.

The center panel 120 includes an opening 130 for receiving inflation fluid for inflating the air bag 14. The center panel 120 also includes apertures 132 for receiving fasteners (not shown) for connecting the air bag 14 to other components of the air bag module 30 (e.g., to the housing 34). When the air bag 14 is connected to the housing 34 of the air bag module 30, the opening 130 provides fluid communication between the housing 34 and an inflatable volume 54 of the air bag.

To assemble the air bag 14, the end portions 126 and 128 of the center panel 120 are interconnected to configure the center panel as an endless loop of material. A peripheral portion 162 of the first side panel 160 is interconnected with the first edge portion 122 of the center panel 120. A peripheral portion 182 of the second side panel 180 is interconnected with the second edge portion 124 of the center panel 120. When formed as a loop, the center panel 120 has a length that is equal to or about equal to the lengths of the peripheral portions 162 and 182 of the side panels 160 and 180 to which they are interconnected. The center panel 120 and side panels 160 and 180, when connected, help define the inflatable volume 54 of the air bag 14.

According to the present invention, the air bag 14 includes at least one self-adapting vent 140 for selectively releasing inflation fluid from the inflatable volume 54 of the air bag 14. In the first embodiment, each of the first side panel 160 and the second side panel 180 includes a vent 140. The air bag 14 could, however, include one or more vents 140 formed on the first side panel 160, second side panel 180, center panel 120, or on one or more of these panels. In this description, the vent 140 associated with the first side panel 160 is described in detail, with the understanding that this detailed description applies equally to any such vent, such as one associated with the second side panel 180 or center panel 120.

The vent 140 (FIG. 4) includes one or more vent openings 142 formed in the side panel 160, a vent door panel 144 secured to the side panel, and a flexible elongated member 146, such as a tether, secured to the door panel. The side panel 160 also includes a ride-down vent opening 148. The vent openings 142 and 148 may be formed in the side panel 160 by any suitable means, such as cutting (e.g., laser cutting, knife cutting, or die cutting).

The door panel 144 may have any suitable construction. For example, the door panel 144 may have a construction similar or identical to that of the center panel 120 or side panels 160 and 180. Referring to FIGS. 4-5B, the door panel 144 includes a base portion 150, a reinforcing portion 152 delimited from the base portion by a fold line 154, and a door portion 156 delimited from the reinforcing portion by a fold line 158. The base portion 150 includes one or more vent openings 200, a ride-down vent opening 202, and a tether slot 204. In the first embodiment, the vent openings 200 of the door panel 144 correspond in shape, number, and arrangement to the vent openings 142 in the side panel 160. The base portion 150 may also include alignment or registration notches 170 formed in the periphery of the door panel 144.

The reinforcing portion 152 includes a ride-down vent opening 210 that corresponds in shape and size to the ride-down vent opening 202 of the base portion 150. The reinforcing portion 152 has opposite end portions 212 and 214 that are mirror images, about the fold line 154, with respective portions 216 and 218 of the base portion 150.

The door portion 156 has a generally triangular configuration and extends away from the fold line 158 opposite the reinforcing portion 152. As shown in FIG. 5A, a fold line 220 extends across the door portion 156 and lies generally parallel to the fold line 158. The fold line 220 divides the door portion into a first portion 222 and a terminal second portion 224. Also, as shown in FIG. 5A, the door panel 144 may include means 226 for facilitating folding the panel along the fold lines 154, 158, and 220. The fold facilitating means 226 may, for example, include perforations or slots spaced along the fold lines 154, 158, and 220.

To prepare the door panel 144 for assembly with the side panel 160, the door panel is placed in the condition illustrated in FIGS. 4 and 5B by folding the panel along the fold lines 154, 158, and 220. The reinforcing panel 152 is folded about the fold line 154 to a position overlying the adjacent portion of the base portion 150. In this condition, the end portion 212 of the reinforcing portion 152 mates with the corresponding portion 216 of the base portion 150, the end portion 214 mates with the corresponding portion 218, and the ride-down vent openings 202 and 210 align with each other.

The door portion 156 is then folded back about the fold line 158 so that the first portion 222 of the door portion overlies the reinforcing portion 152. The door portion 156 is folded again about the fold line 220 so that the second portion 224 of the door portion overlies the first portion 222 of the door portion. A first end portion 226 of the vent tether 146 is secured to the second portion 224 of the door portion 156 by means 228, such as stitching. A second end portion 230 of the vent tether 146 opposite the first portion 226 is passed through the slot 204.

Referring to FIGS. 4 and 6A, the door panel 144 in the folded configuration of FIG. 5B is secured to the side panel 160 by means 232, such as stitching, ultrasonic welding, heat bonding, adhesives, or a combination thereof. The door panel 144 is positioned such that the folded over reinforcing portion 152 and door portion 156 are sandwiched between the base portion 150 and side panel 160. As shown in FIG. 4, the periphery 162 of the side panel 160 may include alignment or registration notches 172 that align with the notches 170 in the door panel 144 to help ensure proper positioning and alignment of the door panel and side panel. When the door panel 144 is secured to the side panel 160 as shown in FIGS. 4 and 6A, the vent openings 142 in the side panel align with the vent openings 200 in the door panel. Also, the ride-down vent openings 202 and 210 of the door panel 144 align with the ride-down opening 148 of the side panel 160 to define a ride-down vent 246 in the air bag 14 (see FIGS. 1 and 2).

Referring to FIG. 6A, the second end portion 230 of the vent tether 146 is secured to the side panel 160 by means 240, such as stitching. The second end portion 230 is secured to the side panel 160 at a location on the side panel identified generally at 242, where the second end portion lies when the door portion 156 is unfolded and the tether is drawn taut. This is shown best in FIG. 6B. The second end portion 230 of the vent tether 146 could, however, be connected to the air bag 14 at a different location on the side panel 160 or on the center panel 120. This is shown in FIG. 1, where the connection to the side panel 146 is shown at 240 and the connection to the center panel 120 is shown at 240'

Referring to FIG. 6A, to achieve the connection between the side panel 160 and the vent tether 146, the side panel may be folded or otherwise maneuvered to bring together the location 242 and the second end portion 230 without unfolding the door portion 156. To this end, means 244, such as a tear or tack stitch, may be used to maintain the door portion 156 in the folded condition throughout assembly and installation of the air bag 14. As shown in FIGS. 6A and 7A, the tear stitch 244 may have a V-shaped configuration. This completes assembly of the self adapting vent 140.

Referring to FIGS. 6A-7B, the vent 140 has an open condition (FIGS. 6A and 7A) and a closed condition (FIGS. 6B and 7B). In the open condition, the door portion 156 remains folded, leaving the aligned vent openings 142 and 200 of the side panel 160 and door panel 140 uncovered. In the closed condition, the door portion 156 is unfolded across and covers or closes the aligned vent openings 142 and 200 of the side panel 160 and door panel 140. The door portion 156 is actuated from the open condition to the closed condition through tension on the vent tether 146 which ruptures or otherwise breaks the means 244, thus releasing the door portion to unfold and cover the vent openings 142 and 200.

Once the door panel 144 and vent tether 146 are secured to the side panel 160, the side panel is secured to the center panel 120 to form the air bag 14 as described above. Referring to FIG. 3, the alignment notches 172 on the periphery 162 of the side panel 160 align with notches 178 in the center panel 120 to help ensure proper positioning and alignment of the side panel and center panel.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition illustrated in solid lines in FIGS. 1 and 2. The air bag 14, while inflated, helps protect the vehicle occupant 20 from impacts with parts of the vehicle 12, such as the instrument panel 36.

When an event for which inflation of the air bag 14 occurs, the occupant 20 moves in the forward direction indicated by the arrow labeled 42 in FIGS. 1 and 2 into engagement with the air bag 14. In FIG. 1, the occupant 20 is shown in a normally seated position, generally upright and positioned against a backrest portion 26 of the seat 22. As a result, the air bag 14 inflates and deploys to a normally inflated position shown in FIG. 1.

In FIG. 2, the occupant 20 is positioned away from the normally seated position. More particularly, in FIG. 2, the occupant 20 is leaned forward from the normally seated position of FIG. 1. As a result, as shown in FIG. 2, the occupant 20 may block or otherwise impede the air bag 14 from inflating to the normally inflated position.

The ride-down vent 246 provides constant venting of the air bag 14 regardless of whether the occupant 20 is in the normally seated position (FIG. 1) or positioned away from the normally seated position (FIG. 2) when the air bag 14 is inflated. The ride-down vent 246 thus vents inflation fluid from the inflatable volume 54 of the air bag 14 throughout the duration of the event for which inflation of the air bag is desired. The ride-down vent 246 may thus help provide desired ride-down characteristics of the air bag 14.

The self-adapting vent 140 adapts based on the position of the occupant 20 upon the occurrence of the event for which inflation of the air bag 14 is desired. Prior to such an event, the vent 140 is in the open condition while stored in the air bag module 30.

If, upon the occurrence of the event, the occupant 20 is in the normally seated position of FIG. 1, the air bag 14 inflates to the normally deployed condition. As this occurs, the side panel 160 moves toward the normally deployed condition of FIGS. 1 and 6B. The side panel 160 tensions the vent tether 146, which applies a force that pulls on the door portion 156 of the door panel 144. The force applied to the door portion 156 breaks or otherwise ruptures the tear stitching 244 and moves the door portion to the closed condition of FIGS. 1, 6B, and 7B. The door portion 156 blocks inflation fluid flow through the vent openings 142 and 200 and the air bag 14 inflates to the normally deployed and pressurized condition of FIG. 1.

If, upon the occurrence of the event, the occupant 20 is positioned away from the normally seated position (see FIG. 2), the air bag 14 may be impeded from inflating to the normally deployed condition. Because of this, the side panel 160 does not move to the normally deployed condition and therefore does not tension the vent tether 146. As a result, the door portion 156 is not positioned over the vent openings 142 and 200 and the vent 140 remains in the open condition of FIGS. 2, 6A, and 7A. The vent 140 thus permits inflation fluid flow through the vent openings 142 and 200.

Those skilled in the art will appreciate that an occupant positioned away from the normally seated position may be positioned such that the door portion 156 partially covers the vent openings 142 and 200. Advantageously, the degree to which the occupant 20 is positioned away from the normally seated position may correspond to the degree to which inflation fluid venting through the vent openings 142 and 200 should be blocked. To this end, the configuration (e.g., the size, shape, and arrangement) of the vent openings 142 and 200 and the configuration of the door panel 144 may be tailored such that the degree of venting, i.e., the effective cross-sectional flow area, of the vent 140 is directly related to the degree to which the occupant is positioned away from the normally seated position.

In the woven fabric construction of the air bag 14, the panels 120, 144, 160, and 180 include a plurality of warp yarns (sometimes referred to as "ends" or "picks") and a plurality of weft yarns (sometimes referred to as "fills") oriented perpendicular to each other and interlaced, i.e., woven together. The warp yarns and weft yarns are thus woven around each other in an alternating "up and down" fashion. Depending on the particular weave pattern, one or more weft yarns are woven alternately over and under one or more warp yarns.

Figure 8:
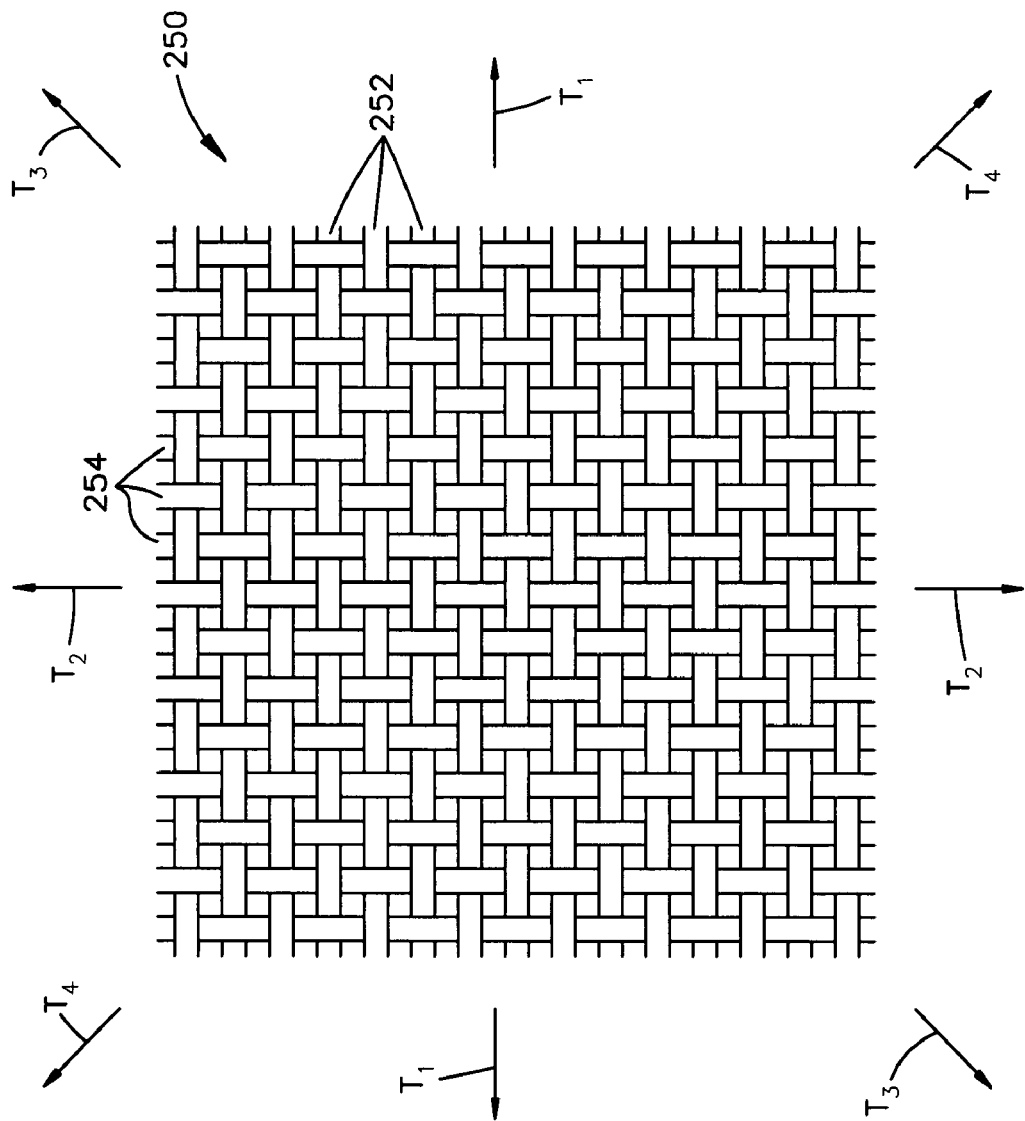
FIG. 8 is a magnified view illustrating a fabric that may be used to construct a portion of the apparatus.

FIG. 8 illustrates by way of example a piece of woven fabric 250 that may be used to construct portions of the apparatus 10. The fabric 250 includes a plurality of warp yarns 252 and weft yarns 254 woven in a one-by-one (1×1) weave pattern referred to in the art as a "plain weave" pattern. In this plain weave pattern, each warp yarn 252 is woven around each weft yarn 254 in an alternating fashion. Likewise, in the plain weave pattern, each weft yarn 254 is woven around each warp yarn 252 in an alternating fashion. Thus, in the plain weave pattern, the warp yarns 252 and weft yarns 254 are thus interlaced or woven around each other at every intersection. An example of other weave patterns that may be used to construct the air bag 14 could be a basket weave, such as a 1×2 or 2×2 basket weave.

Also, the panels 120, 144, 160, and 180 of the air bag 14 have a weave density associated with their respective woven constructions. The weave density of woven fabric refers to the number of threads in the warp or weft direction per unit length (e.g., yarns per inch or yarns per centimeter). The weave density can be limited by factors such as the weave pattern (e.g., 1×1, 1×2) and by the size or weight of the yarn, which can be measured as the denier of the yarn (the weight in grams of 9,000 meters of yarn) or the decitex/dtex of the yarn (the weight in grams of 10,000 meters of yarn). Thus, for example, the woven fabric 250 of FIG. 8 may be woven in a plain 1×1 weave using 470 dtex nylon 6-6 yarn with a weave density of 18 picks/cm and 18 ends/cm.

In the art of weaving and woven fabrics, the term "weave orientation" is used to describe or refer to the directions along which the yarns of the woven fabric extend. The descriptive phrase "along the weave orientation" or "with the weave orientation" of the fabric is used to describe the direction as being parallel to either the warp yarns or weft yarns. Thus, for example, if a tension applied to the fabric is described as being along or with the weave orientation, the tension is applied parallel to the warp yarns or weft yarns. Referring to FIG. 8, tensions applied along the weave orientation of the fabric 250 are indicated generally by the arrows labeled $T_1$ and $T_2$. Tension $T_1$ is along the warp weave orientation and tension $T_2$ is along the weft weave orientation.

The descriptive phrase "against the weave orientation" of the fabric is used to describe the direction as being non-parallel, transverse, or at an acute angle to both the warp and weft yarns. Thus, for example, if a tension applied to the fabric is described as being against the weave orientation, the tension applied is parallel to neither the warp yarns nor the weft yarns. Examples of tensions applied against the weave orientation of the fabric 250 are indicated generally by the arrows labeled $T_3$ and $T_4$, both of which are applied at acute angles to both the warp weave orientation and weft weave orientation. The tensions $T_3$ and $T_4$ are applied at an angle of about 45° to both the warp weave orientation and weft weave orientation. Generally speaking, woven fabrics tend to be more stretch and deformation resistant when tensioned along the weave orientation than when tensioned against the weave orientation.

When the woven fabric 250 is tensioned along the weave orientation (e.g., tensions $T_1$ and $T_2$), deformation of the fabric 250 is limited primarily to stretching or elongation. The degree of stretching or elongation exhibited by the fabric 250 is dictated primarily by the elongation properties of the yarns 252, 254 used to weave the fabric. This is because tension applied along the weave orientation of the material is applied parallel to the warp yarns 252 ($T_1$), weft yarns 254 ($T_2$), or both, and thus acts essentially in tension on those yarns.

When the woven fabric 250 is tensioned against the weave orientation (e.g., tensions $T_3$ and $T_4$), the tension is applied to both the warp yarns 252 and weft yarns 254 simultaneously. The fabric 250 undergoes deformation not only in the form of stretching or elongation, but also in the form of warp yarns 252 and weft yarns 254 shifting relative to each other. This can result in wrinkling or puckering of the fabric 250. Thus, the degree of deformation exhibited by the fabric 250 when tensioned against the weave orientation is dictated not only by the elongation properties of the yarns 252, 254 used to weave the fabric, but also by the degree to which the warp and weft yarns move or shift relative to each other under the tension. Factors that help determine the degree of shifting include the magnitude of the tension applied against the weave orientation of the fabric 250, the angle at which the tension is applied against the weave orientation of the fabric, the weave pattern of the fabric, and the weave density of the fabric.

According to the present invention, the air bag 14 and, in particular, the vent 140 is configured to have several advantageous construction features that take into account the weave orientation of the woven material used to construct the air bag. To illustrate this, the weave orientation of the door panel 144 is indicated generally by the perpendicularly crossed lines indicated at 260 in FIGS. 5A-7B. For the weave orientation 260 of the door panel 144, the warp weave orientation may be indicated by the horizontal component and the weft weave orientation may be indicated by the vertical component, or vice versa. The weave orientation of the side panel 160 is illustrated generally by the perpendicularly crossed lines indicated at 270 in FIGS. 4 and 6A-6B. For the weave orientation 270 of the side panel 160, the warp weave orientation may be indicated by the horizontal component and the weft weave orientation may be indicated by the vertical component, or vice versa.

Referring to FIG. 4, grid-like portions 272 of the side panel 160 help define the vent openings 142. The portions 272 extend generally parallel to the weave orientation 270 of the side panel. Because the portions 272 are configured to extend along the weave orientation 270, the woven yarns forming the portions 272 extend through their entire lengths and to the periphery of the side panel 160, where the connections (e.g., stitching, not shown) secure the side panel to the center panel 180. Thus, inflation and deployment forces acting on the portions 272, such as those acting on the portions 272 when inflation fluid is forced through the openings 142, result in tension forces acting along the weave orientation 270 of the portions 272. This strengthens the portions 272 and helps ensure that the portions 272 withstand inflation forces, deployment forces, and impact forces. This also helps minimize stretching or deformation of the portions 272, and thus the openings 142, throughout inflation, deployment, and impacts with the air bag 14.

Similarly, referring to FIGS. 5A-7B, grid-like portions 262 of the door panel 144 help define the vent openings 200 and extend generally parallel to the weave orientation 260 of the side panel. Because the portions 262 are configured to extend along the weave orientation 260, the woven yarns forming the portions 262 extend through the entire length of the portions 262 and to the periphery of the door panel 144, where the connections (e.g., stitching, not shown) secure the door panel to the side panel 160. Thus, inflation and deployment forces acting on the portions 262, such as those acting on the portions 262 when inflation fluid is forced through the openings 200, result in tension forces acting along the weave orientation 260 of the portions 262. This helps minimize stretching or deformation of the portions 262 and, thus the openings 200, throughout inflation, deployment, and impacts with the air bag 14. The portions 262 of the door panel 144, overlying the portions 272 of the side panel 160, also help reinforce the portions 272 of the side panel.

The door portion 156 of the door panel 144 is also configured to take advantage of the weave orientation 260 of the door panel. As shown in FIGS. 5A-7B, opposite edge portions 264 of the door portion 156 converge to give the door portion its generally triangular configuration. The edge portions 264 are configured to extend parallel or substantially parallel to the weave orientation 260 of the door panel 144. The vent tether 146 is connected to the door portion 156 at a location 266 on the door panel where the edge portions 264 merge together. When the air bag 14 inflates and deploys, the tether 146 is tensioned in a direction that bisects the angle defied by the converging edge portions 264, as indicated generally at $T_5$ in FIGS. 7A and 7B. Since the edge portions 264 are perpendicular or substantially perpendicular, the tension $T_5$ is transferred to both edge portions at an angle of about 45°. The tension $T_5$ is transferred to the door portion 156 substantially along the weave orientation 260 of the door panel 144, as indicated generally by the arrows indicated generally at $T_{5A}$ and $T_{5B}$.

Because the tension $T_5$ is transferred along the weave orientation 260, stretching or deformation of the door portion 156 due to the tension $T_5$ is reduced. The tension $T_{5A}$ and $T_{5B}$, being directed along the edge portions 264 and along the weave orientation 260, helps ensure that the door portion 156 is drawn to a tight and flat engagement with the side panel 160, which helps ensure a good seal and helps prevent leakage when the vent 140 is in the closed condition.

To help facilitate the implementation of the generally triangular door portion 156, the vent openings 142 and 200 are arranged in a generally triangular pattern that corresponds to the triangular configuration of the door portion 156. Those skilled in the art, however, will appreciate that the vent openings 142 and 200 may be arranged in any pattern that the triangular door portion 156 is capable of covering to provide the functions described herein.

Figure 9:
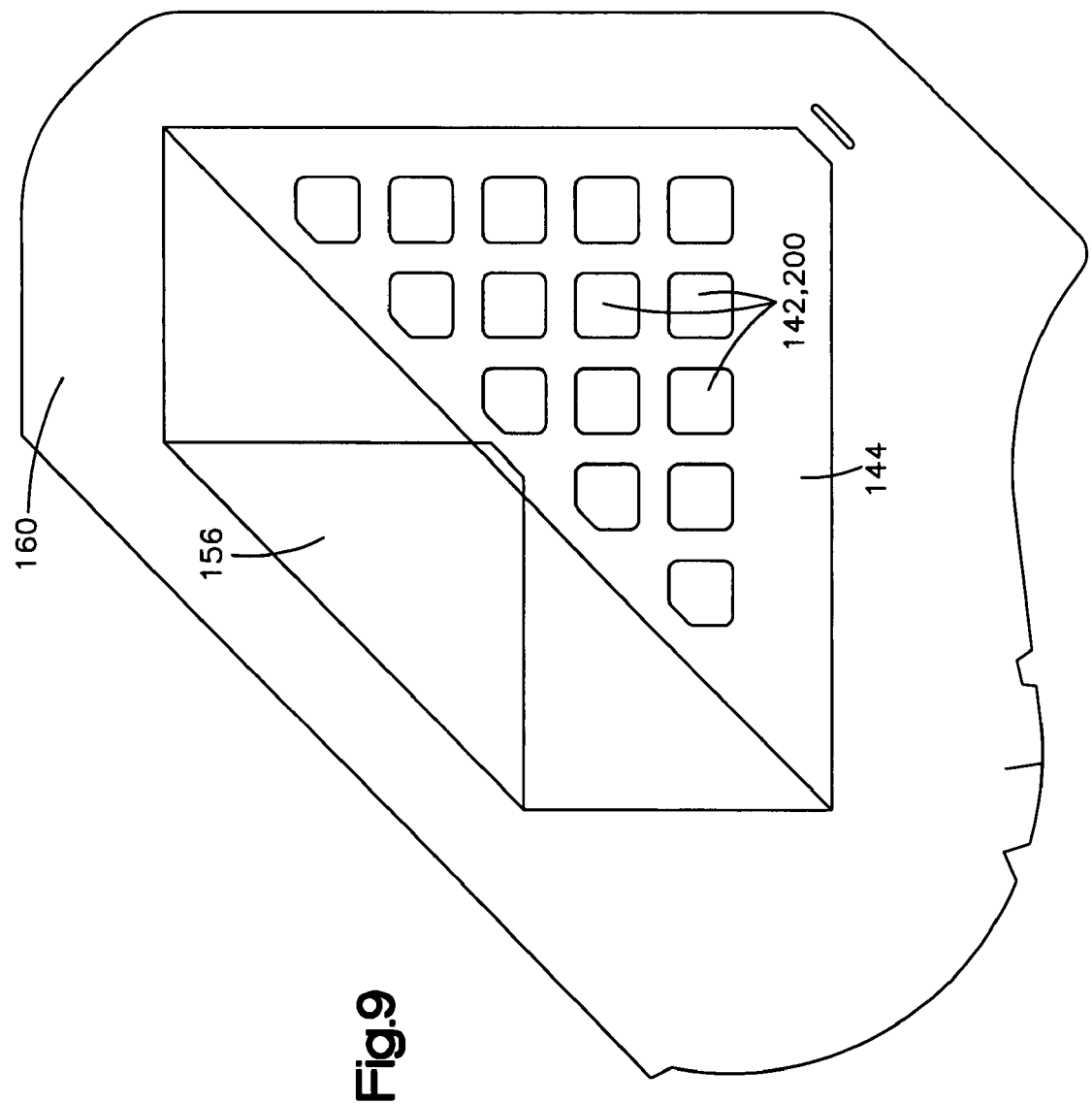
FIG. 9 is a plan view of a portion of the apparatus illustrating an alternative arrangement of the vent openings of the apparatus.

For example, FIG. 9 illustrates an alternative triangular arrangement of the vent openings 142 and 200 in the side panel 160 and door panel 144, respectively. As shown in FIG. 9, the vent openings 142 and 200 are arranged in a generally triangular pattern that corresponds with the triangular configuration of the door portion 156. In the embodiment of FIG. 9, however, there are fifteen vent openings versus the eleven vent openings in the embodiment of FIGS. 1-8. Depending on the size of the openings, the effective area of the vent openings may be the same as or increased over that of the embodiment of FIGS. 1-8.

A second embodiment of the present invention is illustrated in FIGS. 10-16. The second embodiment of the invention is similar to the first embodiment of the invention illustrated in FIGS. 1-9. Accordingly, numerals similar to those of FIGS. 1-9 will be utilized in FIGS. 10-16 to identify similar components, the suffix letter "a" being associated with the numerals of FIGS. 10-16 to avoid confusion.

Figure 10:
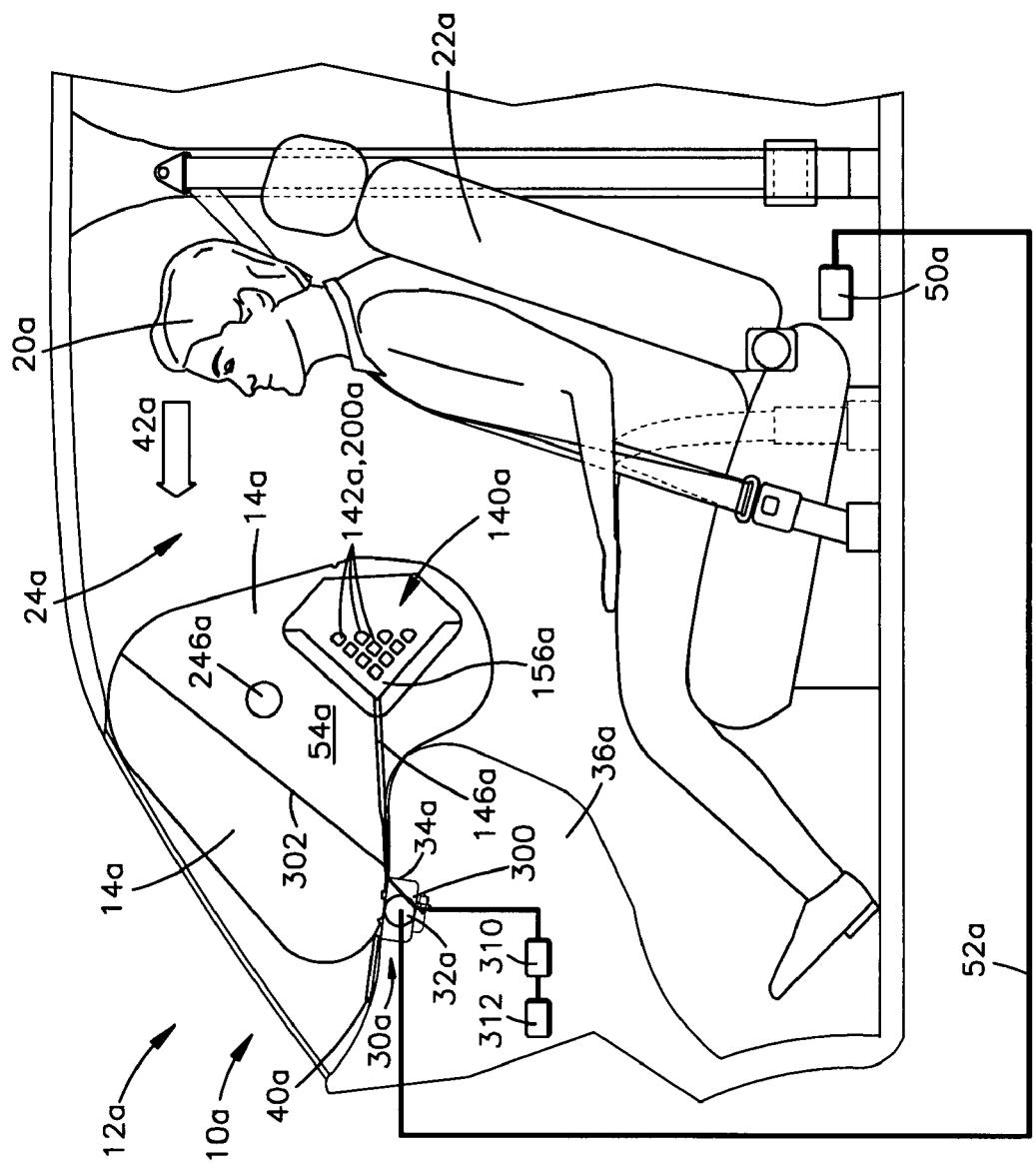
FIG. 10 is a schematic side view illustrating an apparatus for helping to protect an occupant of a vehicle with the occupant being in a first position, according to a second embodiment of the present invention.
Figure 11:
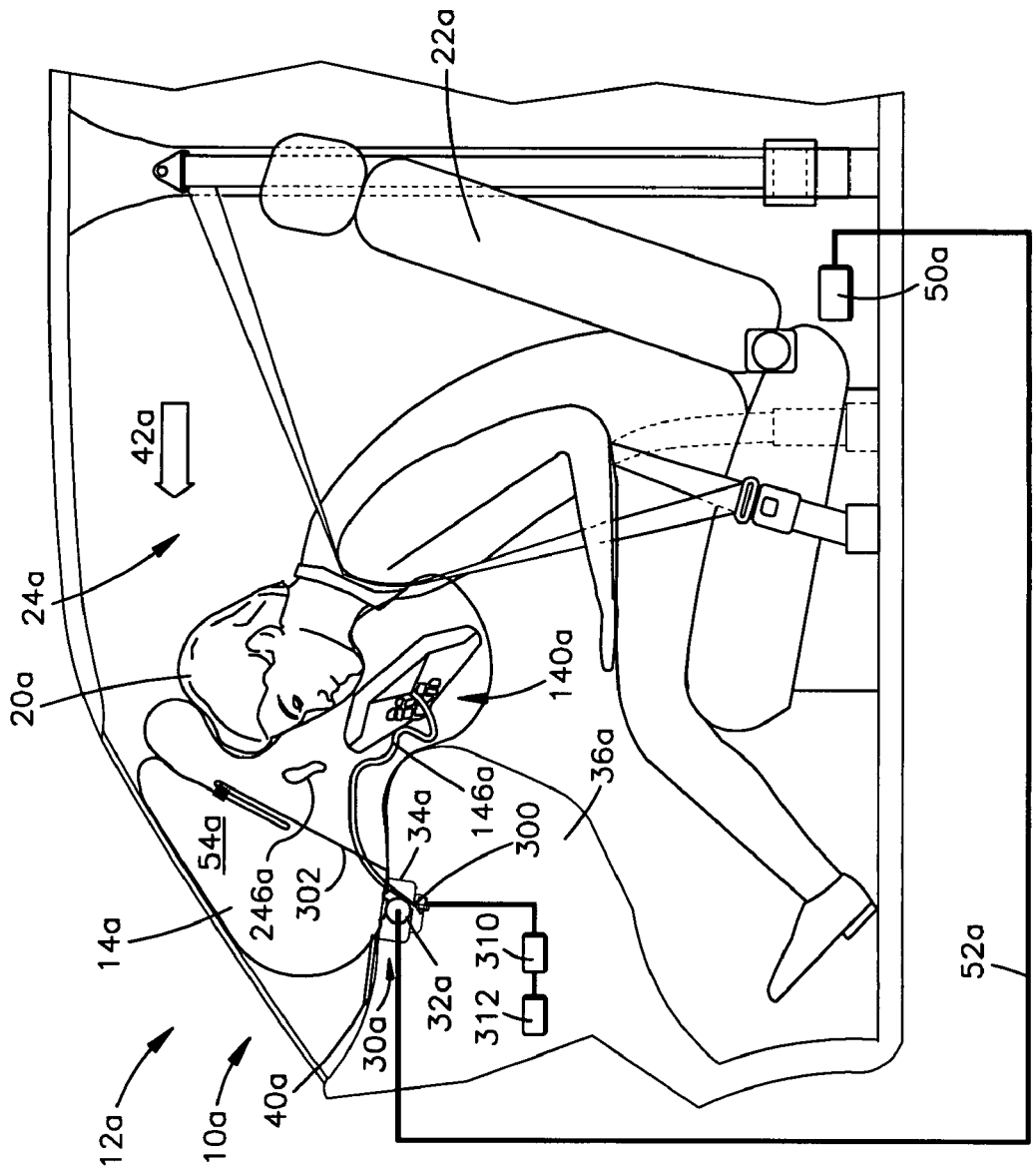
FIG. 11 is a schematic illustration of the apparatus of FIG. 10 with the vehicle occupant in a second position.
Figure 12:
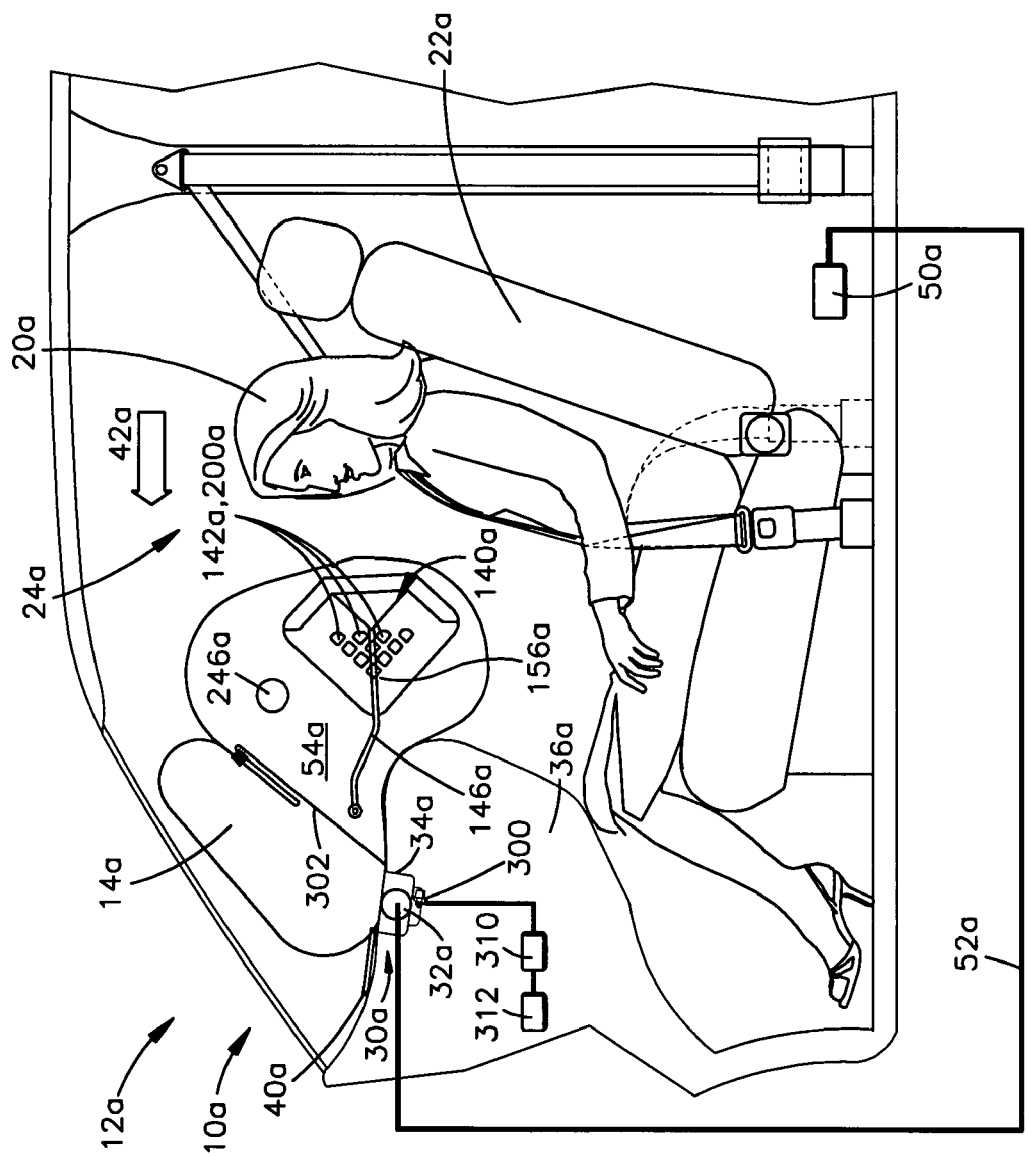
FIG. 12 is a schematic illustration of the apparatus of FIG. 10 with a different vehicle occupant.

Referring to FIGS. 10-12, an apparatus 10a for helping to protect an occupant 20a of a vehicle 12a includes an inflatable vehicle occupant protection device 14a in the form of an air bag. In the embodiment illustrated in FIGS. 10 and 11, the air bag 14a is a passenger frontal air bag for helping to protect an occupant 20a of a seat 22a on a passenger side 24a of a vehicle 12a. Those skilled in the art, however, will appreciate that the apparatus 10a could be adapted to help protect a front driver side seated occupant (not shown) or a rear seat occupant (not shown).

The apparatus 10a of the second embodiment has a configuration similar or identical to the apparatus of the first embodiment. Thus, the air bag 14a may be part of an air bag module 30a that includes an inflator 32a and a housing 34a. The air bag 14a has a stored condition (not shown) in which the air bag is folded and placed in the housing 34a. The module 30a is mounted to a dash or instrument panel 36a of the vehicle 12a. The housing 34a helps contain and support the air bag 14a and inflator 32a in the instrument panel 36a. An air bag door 40a forms a cover for the module 30a and helps enclose the air bag 14a in the stored condition in the housing 34a.

The inflator 32a of the second embodiment may have a configuration similar or identical to the inflator of the first embodiment. Thus, the inflator 32a may be of any known type, such as stored gas, solid propellant, augmented, or hybrid. The apparatus 10a includes a sensor, illustrated schematically at 50a, for sensing an event for which inflation of the air bag 14a is desired, such as a collision. The inflator 32a is operatively connected to the sensor 50a via lead wires 52a.

The materials used to construct the air bag 14a of the second embodiment may be similar or identical to those used to construct the air bag of the first embodiment. Thus, the air bag 14a can be constructed of any suitable material, such as nylon (e.g., woven nylon 6-6 yarns), and may be constructed in any suitable manner. For example, the air bag 14a may include one or more pieces or panels of material that are interconnected by known means, such as stitching, ultrasonic welding, heat bonding, or adhesives, to form the air bag. The air bag 14a may be uncoated, coated with a material, such as a gas impermeable urethane, or laminated with a material, such as a gas impermeable film. The air bag 14a thus may have a gas-tight or substantially gas-tight construction. Those skilled in the art will appreciate that alternative materials, such as polyester yarn, and alternatives coatings, such as silicone, may also be used to construct the air bag 14a.

Figure 13:
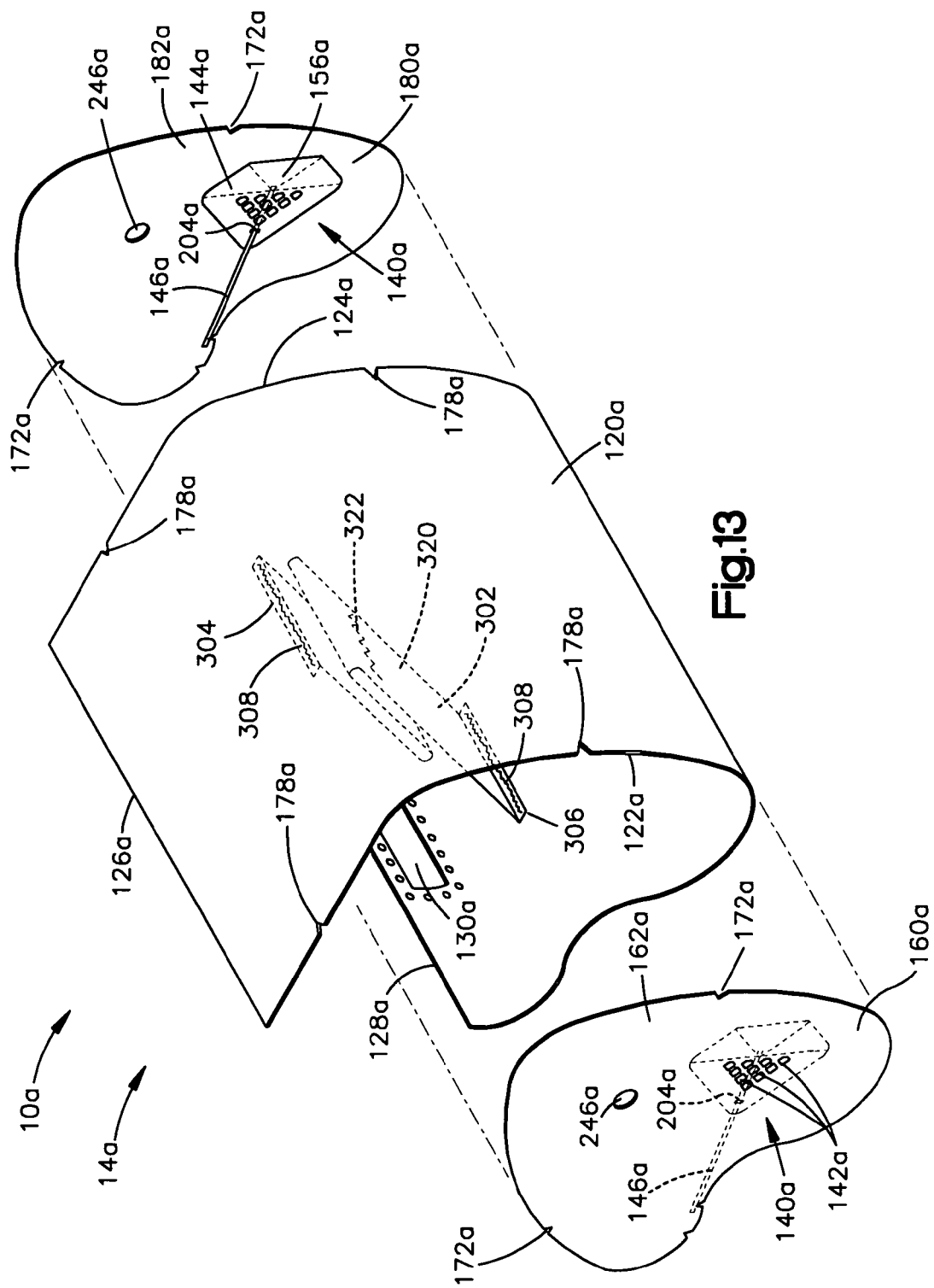
FIG. 13 is an exploded view of a portion of the apparatus of FIG. 10.
Figure 14:
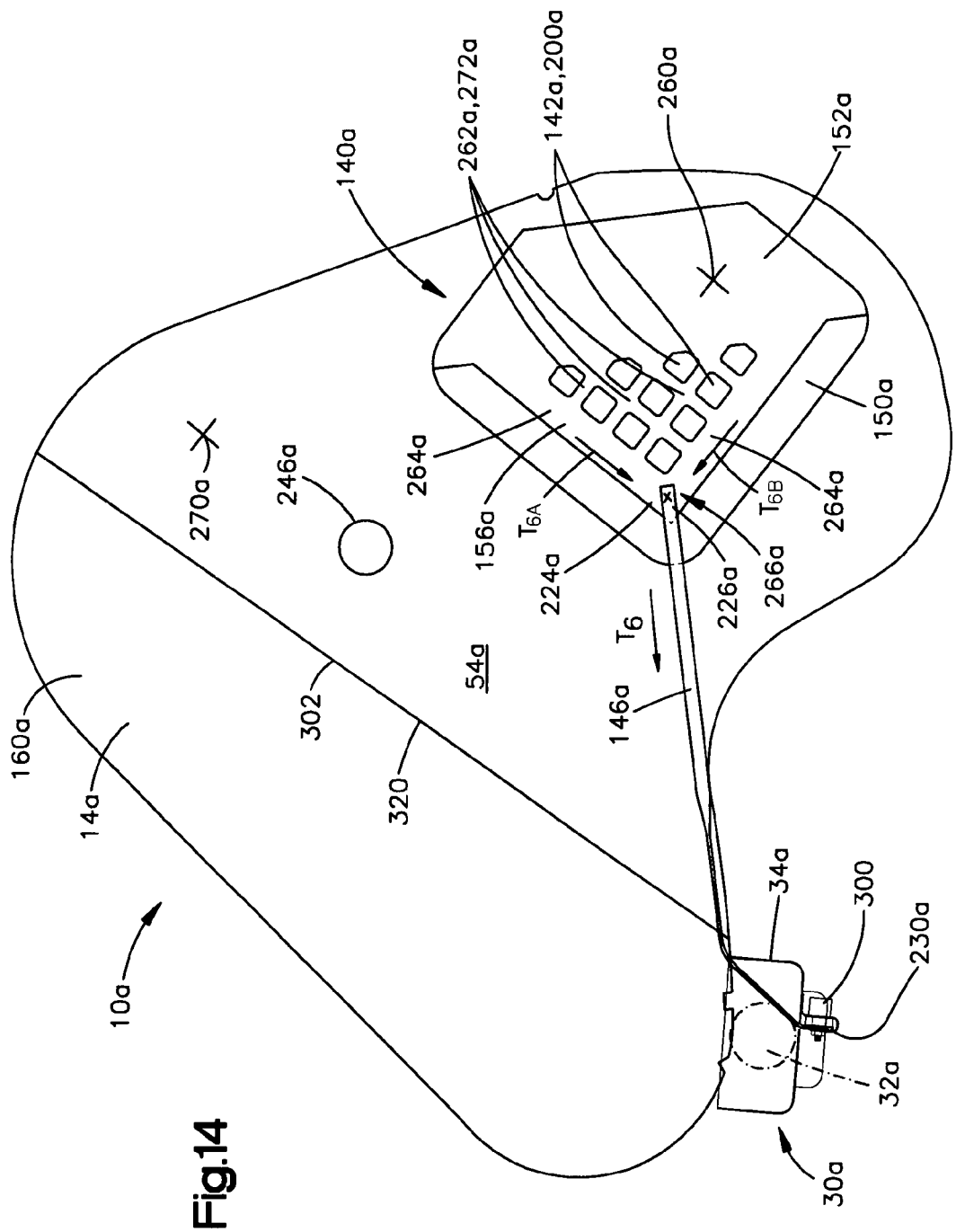
FIGS. 14 and 15 are plan views illustrating portions of the apparatus of FIG. 13 in different conditions.
Figure 15:
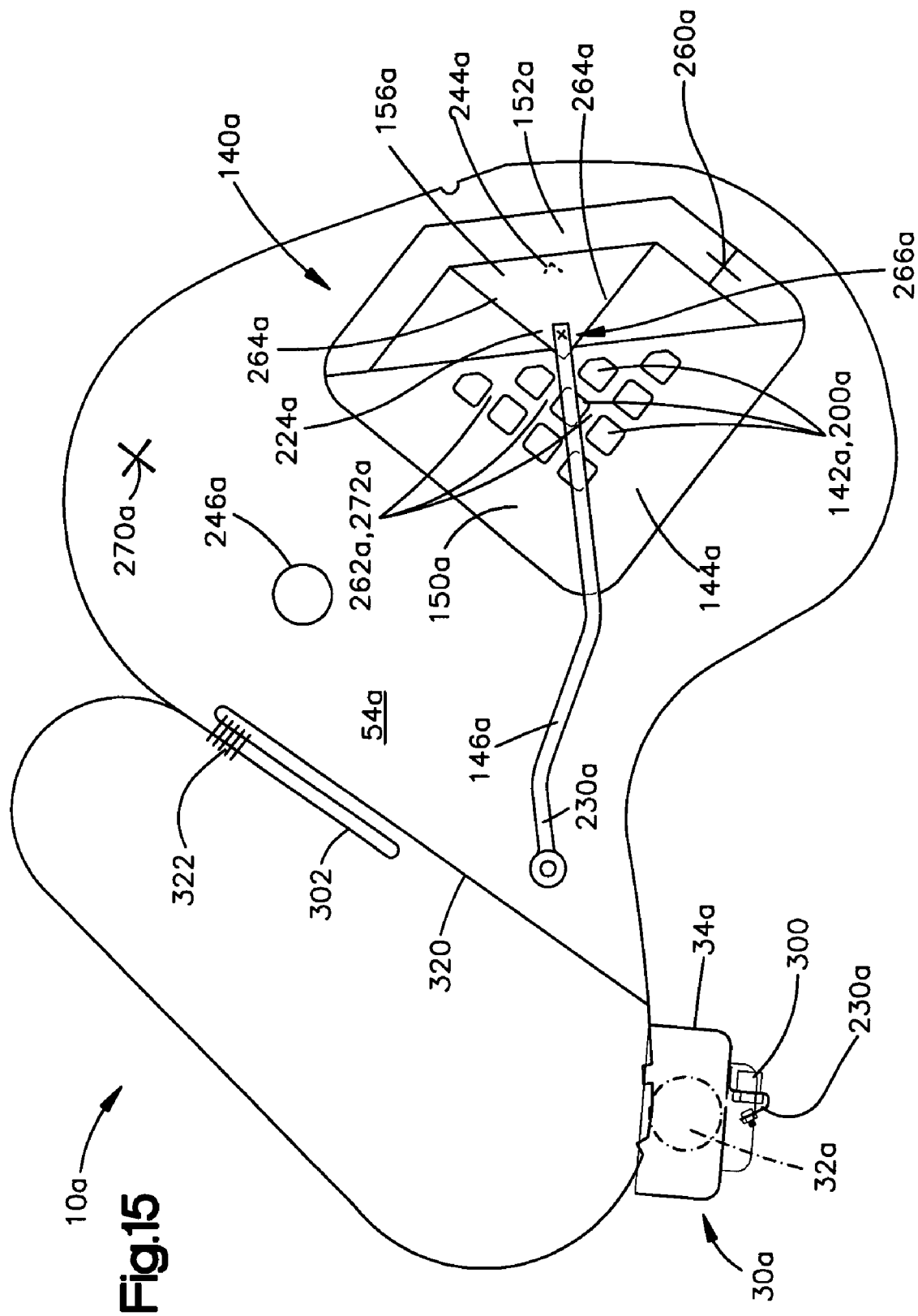

The construction of the air bag 14a is best shown in FIGS. 13-15. In the side view of FIGS. 14 and 15, for clarity, the vents 140a are illustrated primarily in solid lines, instead of hidden lines. The construction of the air bag 14a, in many respects, is also similar or identical to the air bag construction of the first embodiment. Particularly, referring to FIG. 13, the air bag 14a includes a center panel 120a and first and second side panels 160a and 180a, respectively. The center panel 120a includes first and second longitudinal edge portions 122a and 124a, respectively, and opposite end portions 126a and 128a, respectively. The side panels 160a and 180a have curved and contoured configurations that define the profile of the air bag 14a and the inflated configuration (e.g., shape and depth) of the air bag 14a.

The center panel 120a and side panels 160a and 180a are interconnected to form the air bag 14a. The panels may include registration notches 172a and 178a to aid in making these connections. A peripheral edge portion 162a of the first side panel 160a is secured to the first longitudinal edge portion 122a of the center panel 120a. A peripheral edge portion 182a of the second side panel 180a is secured to the second longitudinal edge portion 124a of the center panel 120a. The opposite end portions 126a and 128a of the center panel are secured to each other.

The self-adapting vents 140a of the second embodiment are configured and constructed in a manner and with materials similar or identical to those used to configure and construct the vents of the first embodiment. Therefore, some details relating to the construction of the vents 140a not repeated in the description of the second embodiment can be drawn from the illustrations and descriptions herein of the vents of the first embodiment. Also, as with the description of the first embodiment of FIGS. 1-9, when only a single vent 140a is described in detail, it will be the vent 140a associated with the side panel 160a.

The vent 140a (FIGS. 13-15) includes one or more vent openings 142a formed in the side panel 160a, a vent door panel 144a secured to the side panel, and a flexible elongated member 146a, such as a tether, secured to the door panel. The side panel 160a also includes a ride-down vent opening 246a. The door panel 144a includes a base portion 150a, a reinforcing portion 152a, and a door portion 156a. The base portion 150a includes one or more vent openings 200a and a tether slot 204a.

The door panel 144a is folded in a manner similar or identical to that described above in regard to the first embodiment. The folded door panel 144a is secured to the side panel 160a by means (not shown) such as stitching, ultrasonic welding, heat bonding, adhesives, or a combination thereof. The door panel 144a is positioned such that the folded over reinforcing portion 152a and door portion 156a are sandwiched between the base portion 150a and side panel 160a. When the door panel 144a is secured to the side panel 160a, the vent openings 142a in the side panel align with the vent openings 200a in the door panel. Releasable tear stitching 244a may maintain the door portion 156a in the open condition.

As best shown in FIGS. 13-15, in the second embodiment of the present invention, the position and orientation of the vents 140a on the side panels 160a and 180a differs from those of the vents of the first embodiment. The vents 140a are rotated such that the vent tether 146a extends from the terminal end 224a of the door portion 156a in a direction generally forward in the vehicle 12a away from the occupant 20a. Also, in the second embodiment, the vents 140a are positioned near the portion of the air bag 14a proximate the occupant 20a. Further, in the second embodiment, the ride-down vent openings 246a are positioned away from the vents 140a and extend through the side panels 160a and 180a only.

The first end portion 226a of the vent tether 146a is secured to the terminal end 224a of the door portion 156a at location 266a. The second end portion 230a of the vent tether 146a is secured to the vehicle 12a by an actuatable device 300, such as an actuatable fastener. For example, the actuatable device 300 may secure the second end portion 230a to the air bag module 30a, e.g., to the housing 34a. The actuatable device 300 is actuatable to release the second end portion 230a of the vent tether 146a from its connection to the vehicle 12a.

The actuatable device 300 is operatively connected to a controller 310 (see FIGS. 11-13), which is operatively connected to one or more sensing devices or sensors 312. The controller 310 is operative to actuate the actuatable device 300 selectively, and thus release the second end portion 230a of the vent tether 146a, based on vehicle conditions, occupant conditions, or both, sensed via the sensors 312. The sensors 312 may, for example, include one or more of a seat position sensor, a seatbelt buckle latch sensor, a seatbelt tension sensor, a seat weight sensor, an occupant presence sensor, an occupant position sensor, an occupant size sensor, a vehicle impact sensor, and a rollover sensor.

When the air bag 14a inflates and deploys, the vent tether 146a is tensioned, which actuates the vent 140a in a manner similar or identical to that described above in regard to the first embodiment. As the air bag 14a inflates and deploys, the vent 140a moves away from the instrument panel 36a and the vent tether 146a becomes tensioned between the door portion 156a and the actuatable device 300. As a result, the door portion 156a moves across the vent openings 142a and 200a and blocks inflation fluid flow through the vent 140a (see FIGS. 10 and 14). If, however, the actuatable device 300 is actuated, the second end portion 230a of the vent tether 146a is released from its connection with the housing 34a, the vent tether 146a does not become tensioned, and the vent 140a remains open (see FIGS. 12 and 15).

The vent 140a of the second embodiment may also take advantage of the weave orientation of the materials from which they are constructed in a manner similar or identical to that described above in regard to the first embodiment. The grid-like portions 272a of the side panel 160a that help define the vent openings 142a may extend generally parallel to the weave orientation 270a of the side panel. The grid-like portions 262a of the door panel 144a that help define the vent openings 200a may extend generally parallel to the weave orientation 260a of the door panel.

The woven yarns forming the portions 272a extend through their entire lengths and to the periphery of the side panel 160a, where the connections (e.g., stitching, not shown) secure the side panel to the center panel 120a. Thus, inflation and deployment forces acting on the portions 272a, such as those acting on the portions 272a when inflation fluid is forced through the vent openings, result in tension forces acting along the weave orientation 270a of the portions 272a. This strengthens the portions 272a and helps ensure that the portions 272a withstand inflation forces, deployment forces, and impact forces. This also helps minimize stretching or deformation of the portions 272a, and thus the openings 142, throughout inflation, deployment, and impacts with the air bag 14a.

The woven yarns forming the portions 262a extend through the entire length of the portions 262a and to the periphery of the door panel 144a, where the connections (e.g., stitching, not shown) secure the door panel to the side panel 160a. Thus, inflation and deployment forces acting on the portions 262a, such as those acting on the portions 262a when inflation fluid is forced through the vent openings, result in tension forces acting along the weave orientation 260a of the portions 262a. This helps minimize stretching or deformation of the portions 262a and, thus the vent openings, throughout inflation, deployment, and impacts with the air bag 14a. The portions 262a of the door panel 144a, overlying the portions 272a of the side panel 160a, also help reinforce the portions 272a of the side panel.

The door portion 156a of the door panel 144a may also be configured to take advantage of the weave orientation 260a of the door panel. The converging edge portions 264a are configured to extend parallel or substantially parallel to the weave orientation 260a of the door panel 144a. The vent tether 146a is connected to the door portion 156a at the terminal end portion 224a of the door panel where the edge portions 264a merge together. The tension applied to the vent tether 146a by the inflating and deploying air bag 14a is applied in a direction that bisects the angle defined by the converging edge portions 264a, as indicated generally at $T_6$ in FIG. 14. Since the edge portions 264a are perpendicular or substantially perpendicular, the tension $T_6$ is transferred to both edge portions at an angle of about 45°. The tension $T_6$ is transferred to the door portion 156a substantially along the weave orientation 260a of the door panel 144a, as indicated generally by the arrows indicated generally at $T_{6A}$ and $T_{6B}$.

According to the second embodiment of the present invention, the apparatus 10a includes means for reducing the inflated size, volume, or both, of the air bag 14a. Referring to FIGS. 10-15, the apparatus 10a includes a volume reducing flexible elongated member 302, such as a tether or elongated panel of material, connected to the air bag 14a. The volume reducing tether 302 may comprise one or more tethers of varying widths. For example, in the embodiment illustrated in FIGS. 13-15, the volume reducing tether 302 has a width of about one-fourth to one-third the width of the center panel 120a.

Referring to FIGS. 13-15, the volume reducing tether 302 has a first end portion 304 secured to the air bag 14a at a first location and an opposite second end portion 306 secured to the air bag at a second location different than the first location. For example, the first end portion 304 of the volume reducing tether 302 may be secured to the air bag 14a at a location on the center panel 120a positioned generally upward or above the instrument panel 36a. The second end portion 306 may be secured to the air bag 14a at a location on the center panel 120a positioned adjacent or near the housing 34a and inflation fluid inlet 130a. The first and second end portions 304 and 306 are secured to the center panel 120a by means 308, such as stitching (shown), ultrasonic welding, heat bonding, or adhesives.

The volume reducing tether 302 has an intermediate portion 320 between the first and second end portions 304 and 306, which is doubled over onto itself and has overlying portions interconnected via a releasable connection 322, such as tear stitching. The tear stitching 322 is configured to release the overlying portions when forces acting on the tear stitching, such as tension on the volume reducing tether 302, reach or exceed a predetermined magnitude. The volume reducing tether 302 thus has a first, shortened condition (see FIG. 15) when the overlying portions are interconnected via the tear stitching and a second, lengthened condition (see FIG. 14) when the tear stitching 322 releases the overlying portions.

In the shortened condition (FIG. 15), the volume reducing tether 302 limits or restricts movement of the center panel 120a and side panels 160a and 180a of the air bag 14a. The volume reducing tether 302 thus prevents the air bag 14a from reaching the fully deployed, large volume condition of FIG. 10 and maintains the air bag in the reduced size and volume condition of FIG. 15. The volume reducing tether 302, in the shortened condition, is thus effective to reduce or limit the effective size and volume of the air bag 14a. In the lengthened condition, the volume reducing tether 302 provides little or no limit or restriction on movement of the center panel 180a and side panels 160a. The volume reducing tether 302, in the lengthened condition, allows the air bag 14a to reach the fully inflated and deployed condition of FIG. 14.

Upon sensing the occurrence of an event for which inflation of the air bag 14a is desired, such as a vehicle collision, the sensor 50a provides a signal to the inflator 32a via the lead wires 52a. Upon receiving the signal from the sensor 50a, the inflator 32a is actuated and provides inflation fluid to the inflatable volume 54a of the air bag 14a in a known manner. Depending on the occupant and vehicle conditions at the time of the event, the air bag 14a inflates from the stored condition to one of the deployed conditions illustrated in FIGS. 10-12. The air bag 14a, while inflated, helps protect the vehicle occupant 20a from impacts with parts of the vehicle 12a, such as the instrument panel 36a.

When an event for which inflation of the air bag 14a occurs, the occupant 20a moves in the forward direction indicated by the arrow labeled 42a in FIGS. 10-12 into engagement with the air bag 14a. In FIG. 10, the occupant 20a is shown in a normally seated position, generally upright and positioned against a backrest portion 26a of the seat 22a. As a result, the air bag 14a inflates and deploys to a normally inflated and deployed position shown in FIG. 10. In FIG. 11, the occupant 20a is positioned away from the normally seated position. More particularly, in FIG. 11, the occupant 20a is leaned forward from the normally seated position of FIG. 10. As a result, as shown in FIG. 11, the occupant 20a may block or otherwise impede the air bag 14a from inflating to the normally inflated position. In FIG. 12, the occupant 20a is a small occupant in a normally seated position in a seat 22a adjusted to a forward position. The controller 310, detecting the presence of the small occupant 20a, actuates the actuatable device 300. As a result, the vents 140a remain open during inflation, the volume reducing tether 302 remains in the shortened condition, and the air bag 14a inflates and deploys to the reduced size and volume condition shown in FIG. 12.

The self-adapting vent 140a adapts to the position of the occupant 20a upon the occurrence of the event for which inflation of the air bag 14a is desired. The vents 140a of the second embodiment, themselves, function in a manner similar or identical to the vents of the first embodiment. Because the vents 140a of the second embodiment are rotated and moved from the position illustrated in the first embodiment, the actuation forces acting on the vents are applied in a manner different than the manner in which they are applied in the first embodiment. In the second embodiment, the vents 140a are mounted on the side panels 160a and 180a and are thus actuated due to deployment of the side panels during inflation of the air bag 14a.

Prior to an event for which inflation of the air bag 14a is desired, the vent 140a is in the open condition while stored in the air bag module 30a. If, upon the occurrence of the event, the occupant 20a is in the normally seated position of FIG. 10, the air bag 14a inflates to the normally deployed condition see FIGS. 10 and 14). As this occurs, the side panel 160a moves toward the normally deployed condition, the vent tether 146a becomes tensioned, and a force is applied to the door portion 156a of the door panel 144a. The force applied to the door portion 156a moves the door portion to the closed condition. The door portion 156a blocks inflation fluid flow through the vent openings 142a and 200a and the air bag 14a inflates to the normally deployed and pressurized condition.

If, upon the occurrence of the event, the occupant 20a is positioned away from the normally seated position (see FIG. 11), the air bag 14a may be impeded from inflating to the normally deployed condition. If this occurs, the side panel 160a does not move to the normally deployed condition and the vent tether 146a does not become tensioned. As a result, the door portion 156a is not pulled over the vent openings 142a and 200a and the vent 140a remains in the open condition. The vent 140a thus permits inflation fluid flow through the vent openings 142a and 200a.

The actuatable device 300 is actuatable based on the position of the occupant 20a upon the occurrence of the event for which inflation of the air bag 14a is desired. The actuatable device 300 in combination with the vents 140a and the volume reducing tether 302 selectively controls the inflated size and volume of the air bag 14a. When the event triggering inflation of the air bag 14a occurs, the controller 310 selectively actuates the actuatable device 300 based on the vehicle and occupant conditions determined via the sensors 312.

If the conditions determined via the sensors 312 dictate that the reduced size/volume condition of the air bag 14a is desired, the controller 310 actuates the actuatable device 300, and the second end portion 230a of the vent tether 146a is released from its connection to the vehicle 12a. As a result, the vent 140a remains in the open condition and the tear stitching 322 may thus maintain the volume reducing tether 302 in the shortened condition maintaining the air bag 14a in the reduced size/volume condition.

If the conditions determined via the sensors 312 dictate that the fully inflated and deployed condition of the air bag 14a is desired, the controller 310 does not actuate the actuatable device 300, thus maintaining the connection of the second end portion 230a of the vent tether 146a to the vehicle 12a. As a result, the vent 140a may be actuated to the closed condition and the tear stitching 322 may rupture, which permits the air bag 14a to reach the fully inflated and deployed condition.

By way of example, one particular occupant condition that may be sensed to determine whether the reduced volume or fully inflated and deployed is desired is the size of the occupant 20a. The size of the occupant 20a may be quantified with reference to statistical physical parameters belonging to what are referred to as a $95^{th}$ percentile male and $5^{th}$ percentile female occupants. A $95^{th}$ percentile male has physical parameters that, statistically, are equal to or greater than the physical parameters of 95% of the general male population. For example, a 95$^{th}$ percentile male may have a height equal to or greater than 73 inches, and a weight equal to or greater than 213 pounds. A 95$^{th}$ percentile male occupant is thus a relatively large male occupant. A 5$^{th}$ percentile female has physical parameters that, statistically, are equal to or less than the physical parameters of the smallest 5% of the general female population. For example, a 5$^{th}$ percentile female may have a height equal to or less than 59 inches and a weight equal to or less than 108 pounds. A 5$^{th}$ percentile female occupant is thus a relatively small female occupant.

Based on this, it may be desirable, for example, to inflate and deploy the air bag 14*a* to the reduced volume condition when the presence of a small occupant, such as a 5$^{th}$ percentile female occupant, is determined by the controller 310 via the sensors 312. Those skilled in the art will appreciate that there are a variety of manners by which the presence of such a small occupant may be determined or inferred. For example, the sensors 312 may be ultrasonic or optical transducers that actively determine the actual physical size of the occupant 20*a* of the seat 22*a*. As another example, a seat weight sensor may be used to determine the weight on the seat 22*a* and thereby infer the size of the occupant 20*a*. As a further example, the position of the vehicle seat 22*a* may be used to infer the size of the occupant 20*a*, especially on the driver side of the vehicle 12*a*, since a small occupant would typically or necessarily adjust the seat to a full-forward or near full forward position of the seat. In any of these examples, the controller 310 would actuate the actuatable device 300 in response to determining the presence of a small occupant and would not actuate the actuatable device in response to not determining a small occupant.

The selectively actuatable vents 140*a* act in conjunction with the volume reducing tether 302 and actuatable device 300 to tailor inflation and deployment of the air bag 14*a* selectively based on sensed vehicle and occupant conditions and based on whether the occupant is in the normally seated position. As described above, the tear seams 322 do not tear unless the vents 140*a* are in the closed condition. The vents 140*a* do not close unless the occupant 20*a* is not a small occupant and the occupant is in the normally seated position. These two principles of operation allow the apparatus 10*a* to respond dynamically to the occurrence of an event for which inflation of the air bag 14*a* is desired.

Figure 16:
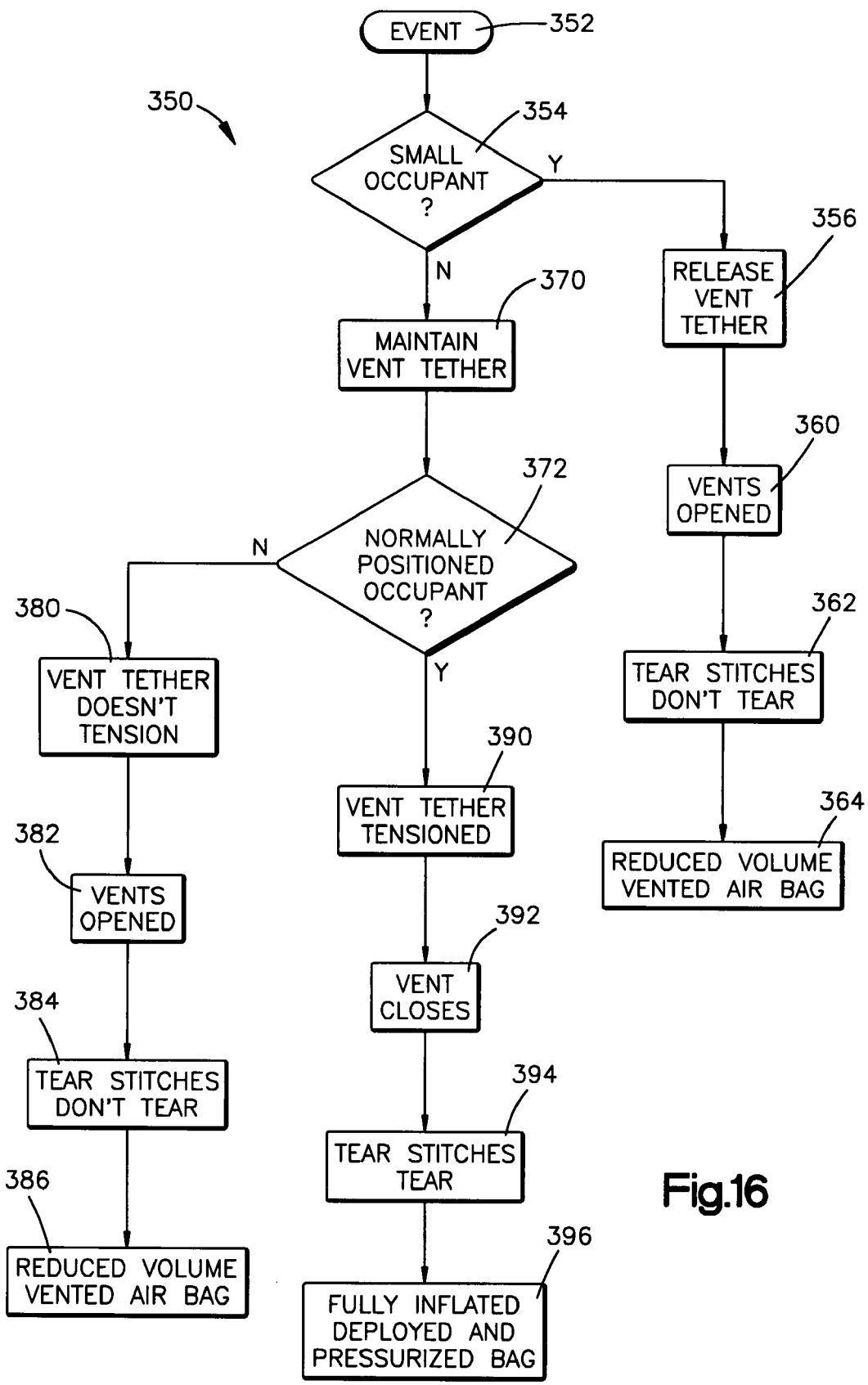
FIG. 16 is a flow diagram illustrating certain aspects of the operation of the apparatus of FIGS. 10-15.

This is illustrated by way of example in FIG. 16, which illustrates a method 350 by which the apparatus 10*a* of the second embodiment of the present invention helps protect the occupant 20*a* of the vehicle 12*a*. Although certain steps of the method 350 of FIG. 16 are illustrated as occurring sequentially and in a certain order, those skilled in the art will appreciate that steps may take place simultaneously, in parallel, or in an order different than that illustrated in FIG. 16.

The method 350 begins at 352 with the occurrence of the event for which inflation and deployment of the air bag 14*a* is desired. At 354, a determination is made as to whether the occupant 20*a* is a small occupant. This determination is made by the controller 310 with information obtained via the sensors 312. If the occupant 20*a* is determined to be a small occupant, the controller 310 actuates the actuatable device 300, which releases the vent tether 146*a*, as indicated at 356. As a result, the vents 140*a* remain opened, as indicated at 360, and the tear stitches 322 do not tear, as indicated at 362. The air bag 14*a* is thus placed in the reduced volume vented condition, as indicated at 364 and shown in FIGS. 12 and 15.

If the occupant 20*a* is determined not to be a small occupant, the controller 310 does not actuate the actuatable device 300, which maintains the connection of the vent tether 146*a* to the housing 34*a*, as indicated at 370. Next, the air bag 14*a* responds in accordance to whether the occupant 20*a* is seated in the normally seated position, as indicated at 372. If the occupant 20*a* is positioned away from the normally seated position, the occupant blocks deployment of the air bag 14*a* and the vent tether 146*a* is not tensioned, as indicated at 380. As a result, the vents 140*a* remain opened, as indicated at 382, and the tear stitches 322 do not tear, as indicated at 384. The air bag 14*a* is thus inflated to the reduced volume and vented condition, as indicated at 386 and shown in FIG. 11.

If the occupant 20*a* is in the normally seated position, the occupant does not block deployment of the air bag 14*a* and the vent tether 146*a* becomes tensioned, as indicated at 390. As a result, the vents 140*a* close, as indicated at 392, and the tear stitches 322 tear, as indicated at 394. The air bag 14*a* is thus inflated to the fully inflated, deployed, and pressurized condition, as indicated at 396 and shown in FIGS. 10 and 14.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, the apparatus comprising:
    an inflatable vehicle occupant protection device having a deflated condition and an inflated condition, the protection device comprising a first panel including at least one first vent opening;
    a second panel secured to the first panel, the second panel comprising a base portion and a door portion, the base portion including at least one second vent opening, the second panel being folded to position the door portion between the first panel and the base portion;
    the door portion having an open condition in which the door portion is positioned away from the first and second openings and thereby permits inflation fluid to vent from the protection device through the first and second vent openings, the door portion having a closed condition in which the door portion is positioned between the first and second vent openings and thereby blocks inflation fluid from venting through the first and second vent openings, the door portion being movable from the open condition to the closed condition when the protection device deploys;
    the door portion having a generally triangular configuration with a base that merges with the base portion of the door panel, the door portion including first and second edge portions that extend away from the base portion and converge at a terminal end of the door portion.

2. The apparatus recited in claim 1, wherein the first and second vent openings are configured and arranged in a triangular vent pattern, the triangular configuration of the door portion corresponding to and covering the triangular vent pattern when the door portion is in the closed condition.

3. The apparatus recited in claim 1, wherein the first and second vent openings are at least partially defined by straight edges that are configured and arranged to extend parallel with one of warp and weft yarns of the panel in which the vent openings are defined.

4. The apparatus recited in claim 1, further comprising a flexible elongated member having a first end portion secured to the terminal end of the door portion and an opposite second end portion secured to the protection device, the flexible elongated member pulling the door portion from the open condition to the closed condition when tension forces are applied to the flexible elongated member by the protection device during deployment.

5. The apparatus recited in claim 4, wherein the base portion of the second panel comprises an aperture through which the flexible elongated member extends.

6. The apparatus recited in claim 4, wherein the first edge portion of the door portion is configured to extend substantially parallel to one of warp yarns and weft yarns of the second panel and the second edge of the door portion is configured to extend substantially parallel to the other of warp yarns and weft yarns of the second panel, the flexible elongated member exerting tension forces on the door portion that are transferred to the door panel substantially parallel to the first and second edge portions in the warp and weft directions.

7. The apparatus recited in claim 1, wherein the first edge portion of the door portion is configured to extend substantially parallel to one of warp yarns and weft yarns of the second panel and the second edge of the door portion is configured to extend substantially parallel to the other of warp yarns and weft yarns of the second panel, the apparatus further comprising a flexible elongated member that exerts tension forces on the door portion when the protection device deploys, the tension forces being transferred to the door panel substantially parallel to the first and second edge portions in the warp and weft directions.

8. The apparatus recited in claim 1, wherein the second panel is secured to the first panel by stitching that encircles the first and second vent openings.

9. The apparatus recited in claim 8, wherein the stitching defines a perimeter of a chamber formed between the first and second panels, the door portion being positioned in chamber.

10. The apparatus recited in claim 1, further comprising a releasable connection initially maintaining the door portion in the open condition, the releasable connection being rupturable to permit the door portion to move from the open condition to the closed condition.

11. The apparatus recited in claim 10, wherein the releasable connection comprises a tear stitch.

12. The apparatus recited in claim 1, wherein the protection device has a first inflated condition with a first inflated volume and a second inflated condition with a second inflated volume, the second inflated volume being greater than the first inflated volume, the protection device inflating to the first inflated condition when the door portion is in the open condition, the protection device inflating to the second inflated condition when the door portion is in the closed condition.

13. The apparatus recited in claim 12, further comprising at least one connection interconnecting portions of the protection device to maintain the protection device in the first inflated condition, the at least one connection being releasable when the door portion is in the closed condition to allow the protection device to inflate to the second inflated condition, the at least one connection being maintained when the door portion is in the open condition so that the protection device inflates to the first inflated condition.

14. The apparatus recited in claim 13, wherein the at least one connection comprises at least one tear seam, the at least one tear seam being configured to tear due to inflation fluid pressure in the protection device when the door portion is in the closed condition, the at least one tear seam being configured to maintain the interconnection of portions of the protection device when the door portion is in the open condition.

15. An apparatus for helping to protect an occupant of a vehicle, the apparatus comprising:
an inflatable vehicle occupant protection device having a deflated condition and an inflated condition, the protection device having a first panel defining first vent openings for enabling flow of inflation fluid out of the protection device;
a second panel having a first portion defining second vent openings and a second portion defining a vent door, the second vent openings being aligned with the first vent openings;
the vent door having a venting position in which the vent door is positioned away from the aligned first and second vent openings and enabling flow of inflation fluid out of the protection device through the aligned first and second vent openings, the vent door being in the venting position prior to inflation of the protection device;
the vent door having a blocking position in which the vent door blocks inflation fluid flow out of the protection device through the aligned first and second vent openings;
the vent door moving between the venting position and the blocking position when the protection device inflates.

16. The apparatus recited in claim 15, wherein the first and second vent openings are configured and arranged in a triangular vent pattern.

17. The apparatus recited in claim 15, wherein the vent door is in a triangular shape having a base edge and two free edges.

18. The apparatus recited in claim 15, wherein the second panel includes a tether guide slot.

19. The apparatus recited in claim 15, wherein the second panel is attached to the first panel.

20. The apparatus recited in claim 15, wherein the vent door is positioned between the first panel and the first portion of the second panel.

21. The apparatus recited in claim 15, further comprising a tear stitch for holding the vent door in the initial stowed position.

22. The apparatus recited in claim 21, wherein the tear stitch has a V-shaped configuration.

23. The apparatus recited in claim 15, wherein the first and second vent openings are positioned to help minimize cutting the warp and weft yarns across the vent openings pattern.

24. The apparatus recited in claim 17, wherein the free edges are configured to extend along the warp and weft of the fabric.

25. The apparatus recited in claim 15 wherein the protection device has a first inflated condition with a first inflated volume and a second inflated condition with a second inflated volume, the second inflated volume being greater than the first inflated volume, the protection device inflating to the first inflated condition when the vent door is in the venting position, the protection device inflating to the second inflated condition when the vent door is in the blocking position.

26. The apparatus recited in claim 25, further comprising at least one connection interconnecting portions of the protection device to maintain the protection device in the first inflated condition, the at least one connection being releasable when the vent door is in the blocking position to allow the protection device to inflate to the second inflated condition, the at least one connection being maintained when the vent door is in the venting position so that the protection device inflates to the first inflated condition.

27. The apparatus recited in claim 26, wherein the at least one connection comprises at least one tear seam, the at least one tear seam being configured to tear due to inflation fluid pressure in the protection device when the vent door is in the blocking position; the at least one tear seam being configured to maintain the interconnection of portions of the protection device when the vent door is in the venting position.

28. An inflatable vehicle occupant protection device comprising:
- a first panel that helps define an inflatable volume of the protection device, the first panel being constructed from a woven fabric material having a weave orientation; and
- a vent for releasing inflation fluid from the inflatable volume, the vent comprising one or more vent openings in the first panel, the first panel comprising portions that are configured in a grid-like pattern and at least partially define the vent openings, the grid-like portions extending in directions substantially parallel to the weave orientation of the first panel.

29. The inflatable vehicle occupant protection device recited in claim 28, wherein the vent further comprises a second panel secured to the first panel, the second panel comprising a door portion having an open condition permitting inflation fluid to flow through the vent openings and being movable when a tension force is applied to the second panel to a closed condition at least partially blocking inflation fluid flow through the vent openings.

30. The inflatable vehicle occupant protection device recited in claim 29, wherein the second panel has a woven construction and is configured and arranged such that the tension force applied to the door portion acts substantially along the weave orientation of the second panel.

31. The inflatable vehicle occupant protection device recited in claim 29, wherein the door portion has a generally triangular configuration, the tension being applied to the door portion at or near a location where converging edge portions of the door portion merge, the second panel being configured such that the converging edge portions extend substantially along the weave orientation of the second panel.

32. The inflatable vehicle occupant protection device recited in claim 29, wherein the second panel is arranged relative to the first panel such that the weave orientation of the second panel extends in directions substantially parallel to the weave orientation of the first panel.

33. The inflatable vehicle occupant protection device recited in claim 28, wherein the portions arranged in a grid-like pattern comprise portions that extend substantially parallel to a warp weave orientation of the first panel and portions that extend substantially parallel to a weft weave orientation of the first panel.

34. The inflatable vehicle occupant protection device recited in claim 28, wherein the second panel includes a vent reinforcing portion including vent openings configured to correspond with the vent openings in the first panel, the vent reinforcing portion being positioned overlying the first panel such that the corresponding vent openings of the first and second panels align with each other.

35. The apparatus recited in claim 29, wherein the protection device has a first inflated condition with a first inflated volume and a second inflated condition with a second inflated volume, the second inflated volume being greater than the first inflated volume, the protection device inflating to the first inflated condition when the door portion is in the open condition, the protection device inflating to the second inflated condition when the door portion is in the closed condition.

36. The apparatus recited in claim 35, further comprising at least one connection interconnecting portions of the protection device to maintain the protection device in the first inflated condition, the at least one connection being releasable when the door portion is in the closed condition to allow the protection device to inflate to the second inflated condition, the at least one connection being maintained when the door portion is in the open condition so that the protection device inflates to the first inflated condition.

37. The apparatus recited in claim 36, wherein the at least one connection comprises at least one tear seam, the at least one tear seam being configured to tear due to inflation fluid pressure in the protection device when the door portion is in the closed condition; the at least one tear seam being configured to maintain the interconnection of portions of the protection device when the door portion is in the open condition.

38. An inflatable vehicle occupant protection device comprising:
- a first panel that helps define an inflatable volume of the protection device; and
- a vent for releasing inflation fluid from the inflatable volume, the vent comprising one or more vent openings in the first panel and a second panel secured to the first panel, the second panel comprising a door portion having an open condition permitting inflation fluid to flow through the vent openings and being movable when a tension force is applied to the second panel to a closed condition at least partially blocking inflation fluid flow through the vent openings;
- the second panel having a woven construction and being configured and arranged such that the tension force applied to the door portion acts substantially along a weave orientation of the woven second panel.

39. The inflatable vehicle occupant protection device recited in claim 38, wherein the door portion has a generally triangular configuration, the tension force being applied to the door portion at or near a location where converging edge portions of the door portion merge, the second panel being configured such that the converging edge portions extend substantially along the weave orientation of the second panel.

40. The inflatable vehicle occupant protection device recited in claim 39, wherein the vent is configured such that the tension applied to the door portion acts in a direction that bisects the angle defined by the converging edge portions of the door portion.

41. The inflatable vehicle occupant protection device recited in claim 40, wherein the tension acting in the direction bisecting the angle defined by the converging edge portions acts substantially along both a warp weave orientation and weft weave orientation of the second panel.

42. The apparatus recited in claim 38, wherein the protection device has a first inflated condition with a first inflated volume and a second inflated condition with a second inflated volume, the second inflated volume being greater than the first inflated volume, the protection device inflating to the first inflated condition when the door portion is in the open condition, the protection device inflating to the second inflated condition when the door portion is in the closed condition.

43. The apparatus recited in claim 42, further comprising at least one connection interconnecting portions of the protection device to maintain the protection device in the first inflated condition, the at least one connection being releasable when the door portion is in the closed condition to allow the protection device to inflate to the second inflated condition, the at least one connection being maintained when the door portion is in the open condition so that the protection device inflates to the first inflated condition.

44. The apparatus recited in claim 43, wherein the at least one connection comprises at least one tear seam, the at least one tear seam being configured to tear due to inflation fluid pressure in the protection device when the door portion is in the closed condition; the at least one tear seam being configured to maintain the interconnection of portions of the protection device when the door portion is in the open condition.

45. An apparatus for helping to protect an occupant of a vehicle, the apparatus comprising:

an inflatable vehicle occupant protection device having a first inflated condition with a first inflated volume and a second inflated condition with a second inflated volume, the second inflated volume being greater than the first inflated volume; and a vent having an open condition releasing inflation fluid from the protection device through the vent and a closed condition blocking the inflation fluid flow through the vent;

the protection device being maintained in the first inflated condition when the vent is in the open condition, the protection device being released to inflate to the second inflated condition when the vent is in the closed condition.

46. The apparatus recited in claim 45, further comprising at least one connection interconnecting portions of the protection device to maintain the protection device in the first inflated condition, the at least one connection being releasable when the vent is in the closed condition to allow the protection device to inflate to the second inflated condition, the at least one connection being maintained when the vent is in the open condition so that the protection device inflates to the first inflated condition.

47. The apparatus recited in claim 46, wherein the at least one connection comprises at least one tear seam, the at least one tear seam being configured to tear due to inflation fluid pressure in the protection device when the vent is in the closed condition; the at least one tear seam being configured to maintain the interconnection of portions of the protection device when the vent is in the open condition.

48. The apparatus recited in claim 45, wherein the vent is constructed and arranged to be placed in the closed condition when the protection device deploys.

49. The apparatus recited in claim 48, further comprising an actuatable device operatively connected to the vent, the actuatable device being actuatable to prevent the vent from being placed in the closed condition when the protection device deploys.

50. The apparatus recited in claim 45, wherein the vent comprises at least one vent opening in the protection device and a vent panel connected to the protection device, the vent panel comprising a door portion that blocks inflation fluid flow through the at least one vent opening in the closed condition of the vent, the vent panel permitting inflation fluid flow through the at least one vent opening in the open condition of the vent.

51. The apparatus recited in claim 50, wherein the door portion is constructed and arranged to undergo tension when the protection device deploys such that the vent is placed in the closed condition.

52. The apparatus recited in claim 51, further comprising an actuatable device operatively connected to the vent panel, the actuatable device being actuatable to prevent the vent panel from undergoing tension when the protection device deploys.

53. The apparatus recited in claim 52, further comprising a flexible elongated member connecting the actuatable device to the door panel.

54. The apparatus recited in claim 53, wherein the actuatable device comprises an actuatable fastener and the flexible elongated member comprises a tether.

55. The inflatable vehicle occupant protection device recited in claim 51, wherein the door portion has a generally triangular configuration, the tension being applied to the door portion at or near a location where converging edge portions of the door portion merge, the vent panel being configured such that the converging edge portions extend substantially along the weave orientation of the vent panel.

56. The inflatable vehicle occupant protection device recited in claim 55, wherein the tension applied to the door portion acts in a direction that bisects the angle defined by the converging edge portions of the door portion.

57. The inflatable vehicle occupant protection device recited in claim 56, wherein the tension acting in the direction bisecting the angle defined by the converging edge portions acts substantially along both a warp weave orientation and weft weave orientation of the second panel.

58. An apparatus for helping to protect an occupant of a vehicle, the apparatus comprising:
an inflatable vehicle occupant protection device;
a vent having an open condition releasing inflation fluid from the protection device through the vent, the vent being actuatable to a closed condition blocking the inflation fluid flow through the vent; and
a releasable connection maintaining the protection device in a first condition having a first inflated volume, the releasable connection being releasable to permit the protection device to inflate to a second condition having a second inflated volume greater than the first inflated volume;
the releasable connection being releasable when the vent is in the closed condition and being maintained when the vent is in the open condition.

59. The apparatus recited in claim 58, wherein the vent is actuatable to the closed condition when the occupant is in a normally seated position.

60. The apparatus recited in claim 58, wherein the vent is maintained in the open condition when the occupant is positioned away from a normally seated position.

61. The apparatus recited in claim 58, further comprising an actuatable device actuatable to maintain the vent in the open condition and thereby maintain the releasable connection based on at least one of sensed vehicle conditions and sensed occupant conditions.

62. An apparatus for helping to protect an occupant of a vehicle, the apparatus comprising:
an inflatable vehicle occupant protection device;
a vent having an open condition and a closed condition;
a releasable connection that maintains the protection device in a first condition having a first inflated volume when the vent is in the open condition, the releasable connection being releasable to permit the protection device to inflate to a second condition having a second inflated volume greater than the first inflated volume when the vent is in the closed condition; and
an actuatable device actuatable to maintain the vent in the open condition.

63. The apparatus recited in claim 1, further comprising an actuatable device actuatable to prevent the door portion from moving to the closed condition when the protection device deploys.

64. A method for helping to protect an occupant of a vehicle using an inflatable vehicle occupant protection device, the method comprising the steps of:
inflating the protection device in response to an event;
venting inflation fluid from the protection device based on at least one of a sensed vehicle condition and a sensed occupant condition;
the vent having an open condition releasing inflation fluid from the protection device through the vent, the vent being actuatable to a closed condition blocking the inflation fluid flow through the vent;

providing a releasable connection maintaining the protection device in a first condition having a first inflated volume, the releasable connection being releasable to permit the protection device to inflate to a second condition having a second inflated volume greater than the first inflated volume; and adapting the releasable connection to release when the vent is in the closed condition and maintain the releasable connection when the vent is in the open condition.

* * * * *